United States Patent
Kasahara

(10) Patent No.: US 10,162,255 B2
(45) Date of Patent: Dec. 25, 2018

(54) SCREEN APPARATUS

(71) Applicant: ABISARE CO., LTD., Kakegawa-shi, Shizuoka (JP)

(72) Inventor: Keiji Kasahara, Kakegawa (JP)

(73) Assignee: ABISARE CO., LTD., Kakegawa-Shi, Shizuoka (JP)

( * ) Notice: Subject to any disclaimer, the term of this patent is extended or adjusted under 35 U.S.C. 154(b) by 0 days.

(21) Appl. No.: 15/661,156

(22) Filed: Jul. 27, 2017

(65) Prior Publication Data

US 2018/0031961 A1 Feb. 1, 2018

(30) Foreign Application Priority Data

Jul. 27, 2016 (JP) .................. 2016-147135
Mar. 17, 2017 (JP) .................. 2017-053109

(51) Int. Cl.
   *G03B 21/58* (2014.01)
(52) U.S. Cl.
   CPC .................. *G03B 21/58* (2013.01)
(58) Field of Classification Search
   CPC .................. G03B 21/58
   USPC .................. 359/461
   See application file for complete search history.

(56) References Cited

U.S. PATENT DOCUMENTS

| | | | | |
|---|---|---|---|---|
| 3,002,557 A | * | 10/1961 | Roth | G03B 21/58 160/351 |
| 4,406,519 A | * | 9/1983 | Shaw | G03B 21/58 160/328 |
| 7,782,531 B2 | * | 8/2010 | Zhu | G03B 21/56 359/461 |
| 7,872,802 B2 | * | 1/2011 | Seymour | G03B 21/58 359/461 |
| 8,120,846 B2 | * | 2/2012 | Trelohan | G03B 21/58 359/461 |

(Continued)

FOREIGN PATENT DOCUMENTS

| JP | 11293964 A | 10/1999 |
|---|---|---|
| JP | 2004205913 A | 7/2004 |

(Continued)

OTHER PUBLICATIONS

Japanese Office Action dated Oct. 9, 2018 (and English translation thereof) issued in counterpart Japanese Application No. 2017-053109.

*Primary Examiner* — Christopher E Mahoney
(74) *Attorney, Agent, or Firm* — Holtz, Holtz & Volek PC

(57) ABSTRACT

A low-cost screen apparatus capable of realizing, with its simple mechanism, a method of obtaining flatness of a screen body that has been difficult to realize with expansion using an upper and lower crossbar for support. A holding member 11 holding an upper end of a screen body is provided inside a tubular crossbar provided to the upper end of the screen body. The holding member 11 is formed of at least three divisions including: a left-end-part holding member 12 that holds a left end part of the screen body and pulls the screen body toward a left end of the crossbar; a right-end-part holding member 13 that holds a right end part of the screen body and pulls the screen body toward a right end of the crossbar; and a central-part holding member 14 that is disposed between the left-end-part holding member 12 and the right-end-part holding member 13 and holds a central part of the screen body.

4 Claims, 30 Drawing Sheets

(56) References Cited

U.S. PATENT DOCUMENTS

| | | | |
|---|---|---|---|
| 8,184,369 B2 | 5/2012 | Kuroi | |
| 9,880,456 B1* | 1/2018 | Yellin | G03B 21/58 |
| 2007/0153379 A1* | 7/2007 | Mikkelsen | G03B 21/58 |
| | | | 359/461 |
| 2011/0261450 A1* | 10/2011 | Howes | G03B 21/56 |
| | | | 359/443 |
| 2013/0027771 A1* | 1/2013 | Aoki | G03B 21/58 |
| | | | 359/461 |

FOREIGN PATENT DOCUMENTS

| | | |
|---|---|---|
| JP | 2009229915 A | 10/2009 |
| JP | 2011123233 A | 6/2011 |
| JP | 2012022029 A | 2/2012 |
| JP | 2014006307 A | 1/2014 |

* cited by examiner

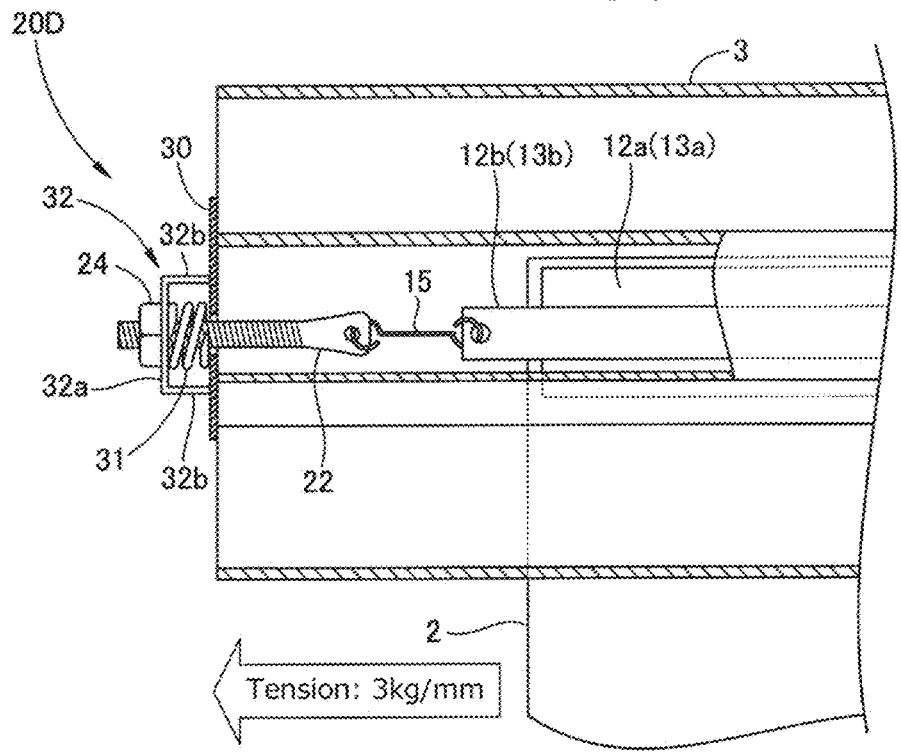
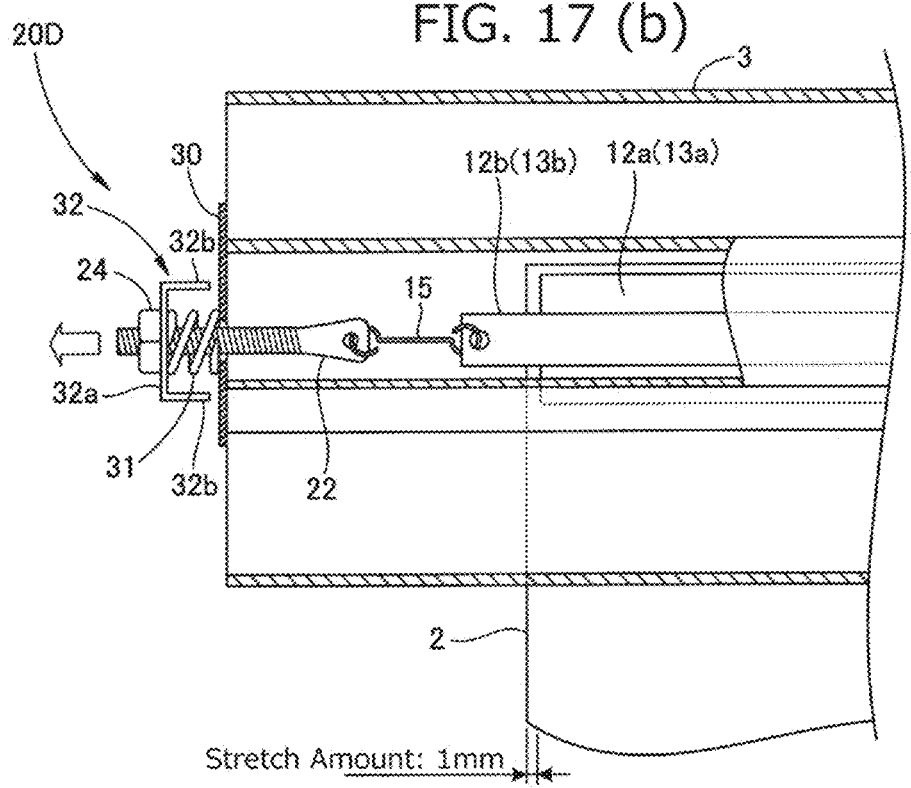

PRIOR ART

PRIOR ART

PRIOR ART

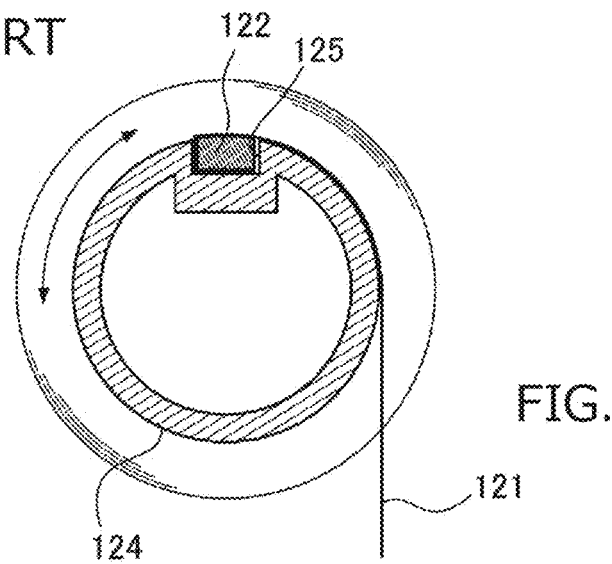
FIG. 25 (a) PRIOR ART
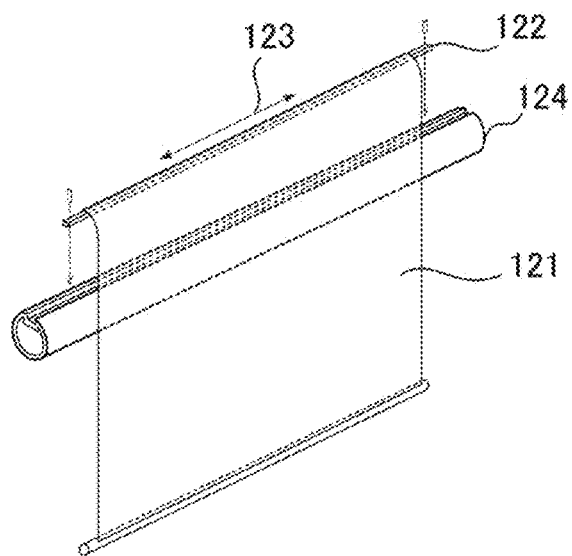
FIG. 25 (b)
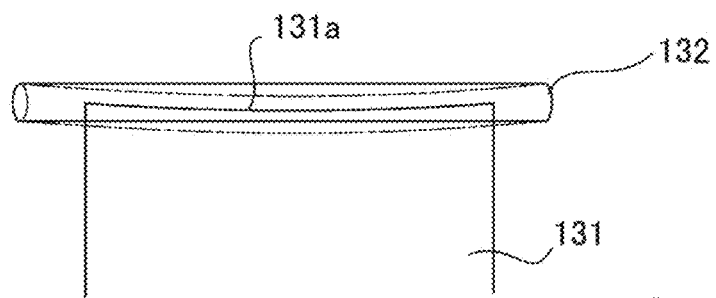
FIG. 25 (c)

PRIOR ART
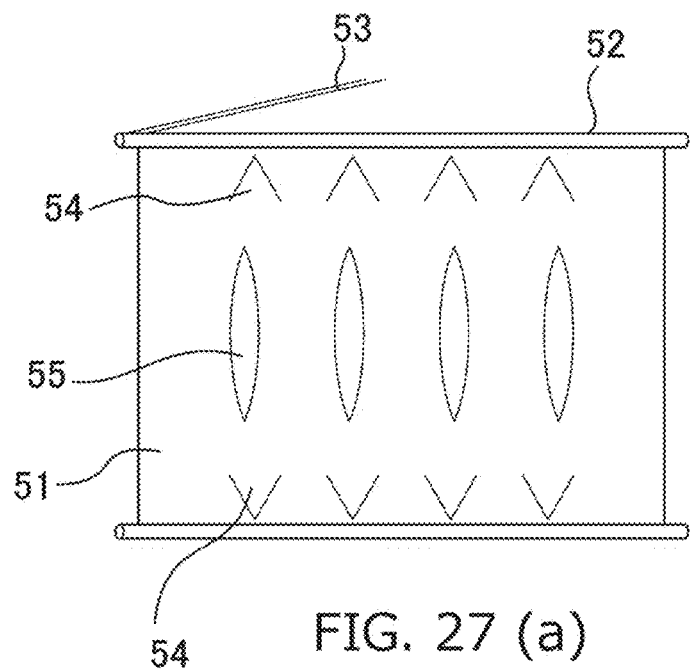
FIG. 27 (a)
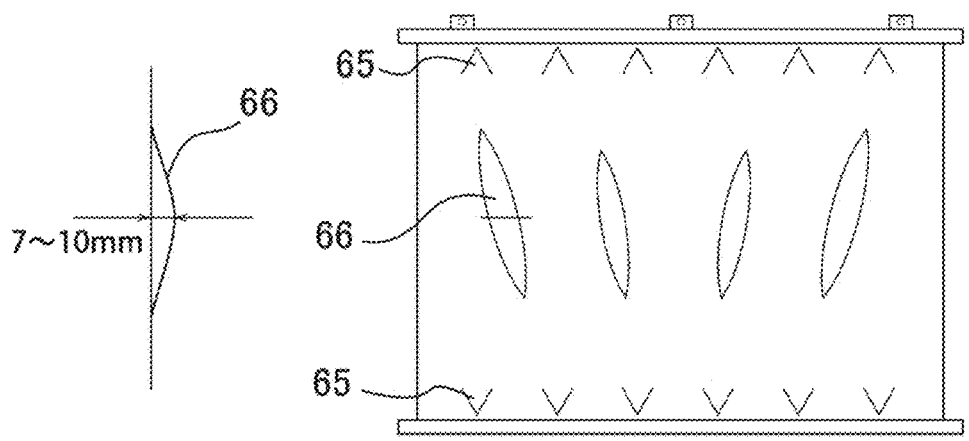
FIG. 27 (c)
FIG. 27 (b)

5~7 mm screen

4~6mm

SCREEN APPARATUS

TECHNICAL FIELD

The present invention relates to a suspended screen apparatus that has its screen body hung on a wall or from a ceiling by a hanging tool for expansion or a floorstanding screen apparatus in which a crossbar attached to an end of a screen body is hooked on a support for expansion.

DESCRIPTION OF THE RELATED ART

Conventionally known screen apparatuses such as used for projection, projectors, and rear projection include suspended screen apparatuses (such as a hanging scroll type and a roll-up type) and a floorstanding roll-up screen apparatus.

The following methods of holding a rectangular screen body to a crossbar (or a winding drum) are used for these screen apparatuses.

(1) As shown in FIG. 19(a), a bag-like part 51a is formed at an upper end of a screen body 51 by sewing, and a crossbar 52 that is made of wood or resin is inserted into the bag-like part 51a. Ends of the crossbar 52 are hooked on a mounting tool 53 such as a hanging hook, and the mounting tool 53 is hung on a wall or from a ceiling.

(2) As shown in FIG. 19(b) or 19(c), a screen holding member 62A or 62B is attached to an upper end of a screen body 61, and the screen holding member 62A or 62B holding the screen body 61 is inserted in an internal space of a tubular crossbar 63A or 63B. A mounting tool 64A or 64B such as a hook is mounted to the crossbar 63A or 63B and is hung on a wall or from a ceiling (see JP 2004-205913 A).

(3) As shown in FIG. 20, an upper end of a screen body 71 is affixed directly to a winding drum (crossbar) 73 by an adhesive tape 72, and the screen body 71 is rolled up by means of a winding device 74 formed of an electric motor or a spring.

(4) As shown in FIG. 21, an outer periphery of a winding drum (crossbar) 81 is partly provided with a recess 82. A screen holding member 84 is attached to an upper end of a screen body 83, and the screen holding member 84 and the screen body 83 are inserted in the recess 82. The screen body 83 is held by resistance force of the screen holding member 84 inside the recess 82 of the winding drum 81.

(5) As shown in FIGS. 22(a) and 22(b), an outer periphery of a winding drum (crossbar) 91 is partly provided with a recess 92, and a screen holding member 93 having such a shape as to engage in the recess 92 is molded of synthetic resin. The screen holding member 93 is attached to an upper end of a screen body 94 and is fitted against the winding drum 91 for connection with the winding drum 91, whereby the screen body 94 is held.

Methods of stretching a screen body from both sides for horizontal expansion are as follows.

(6) As shown in FIGS. 23(a) and 23(b), expansion wires 103 are respectively mounted to end portions of a screen holding member 102 holding a screen body 101, and these wires 103 are respectively pulled in respective directions of ends of a crossbar 104 (that is to say, in arrowed directions). With the screen body 101 tensioned, respective leading ends of the wires 103 are respectively mounted to the ends of the crossbar 104, thus expanding the screen body 101.

(7) As shown in FIGS. 24(a), 24(b) and 24(c), a left and a right side of a screen body 111 are rendered curved and have symmetrical pairs of connecting members 112 attached thereto. Wires 113 that are mounted each extend vertically to pass through the connecting members 112 and place tension between an upper frame (winding drum) 114 and a lower frame 115 via the connecting members 112, thus tensioning the screen body 111 vertically and horizontally (see JP 2009-229915 A, JP 2011-123233 A, JP 2012-022029 A and JP 2014-006307 A).

(8) As shown in FIGS. 25(a) and 25(b), a crossbar 122 is attached to an upper end of a screen body 121. While being tensioned in arrowed directions 123, the crossbar 122 is fitted in a recess 125 of a winding drum 124 for expansion of the screen body 121.

(9) As shown in FIG. 25 (c), a screen body 131 of a roll-up screen apparatus is cut down so that its upper side 131a has a concave arc shape that corresponds to a central part of a winding drum 132 and not to a left or right part of the winding drum 132. When attached to the winding drum 132, the upper side 131a is rendered straight. In this way, the screen body 131 is expanded when suspended.

(10) As shown in FIG. 26, a screen holding member 142 of a floorstanding screen apparatus is attached to an upper end of a screen body 141, and the screen holding member 142 and the upper end of the screen body 141 are inserted into a tubular crossbar 143 to be held. A lower portion of the screen body 141 is mounted to a roll-up device 144 (refer to FIG. 29).

As video projectors and projectors increasingly provide enhanced projection performance in recent years, high-definition image projection has become possible. Also screens onto which images are projected are required to provide enhanced performance, and fineness, color reproducibility, high brightness, and high contrast are required of surface reflective materials of the screens. Moreover, the screens are increasingly large-sized. In a large-sized screen, brightness and flatness are important factors that determine quality of the projected images. With the flatness of the screens being poor particularly during 3D image projection or projection using, for example, a single focus projector, the projected images are distorted, thus badly reflecting on quality of the projectors. As such, there is a demand for low-cost screen apparatuses that provide satisfactory flatness.

When the above-mentioned prior arts are studied from such a viewpoint, the method (1) (illustrated by FIG. 19(a)) problematically cannot provide flatness to the screen body 51 because when the screen body 51 is vertically tensioned under its own weight, wedge-shaped wrinkles 54 occur below the bag-like part 51a as shown in FIG. 27(a), thereby causing vertical wrinkles 55 in the screen body 51 that is consequently rendered wavy.

Similarly, the method (2) (illustrated by FIG. 19(b) or 19(c)) problematically causes wedge-shaped wrinkles 65 below the crossbar 63A or 63B as well as slant wrinkles 66 in the form of truncated V shapes in the entire screen body 61 as shown in FIGS. 27(b) and 27(c). Here, respective centers of the slant wrinkles 66 reach a height of 7 to 10 mm.

With the method (3) (illustrated by FIG. 20), the screen body 71 and the winding drum 73 have different expansion/contraction ratios, so that a difference is caused between respective expansion/contraction lengths of the screen body 71 and the winding drum 73, thus problematically leading to formation of wrinkles in the screen body 71. The method (4) (illustrated by FIG. 21) problematically causes wrinkles even though an expansion/contraction distance is slight as a result of an environmental change causing the screen body 83 to stretch or shrink because the winding drum 81 and the screen body 83 have different expansion/contraction ratios. In the method (5) (illustrated by FIG. 22(a) or 22(b)), the screen holding member 93 is rigidly fitted against the winding drum 91 to be mounted, so that wrinkles 95 shown in FIGS. 28(*a*) and 28(*b*) problematically appear as a result of a slight difference between respective expansion/contraction lengths of the winding drum 91 and the screen body 94.

With the method (6) (illustrated by FIGS. 23(*a*) and 23(*b*)) in which the screen holding member 102 is always tensioned, as the screen body 101 stretches or shrinks in suspended condition, inside the crossbar 104, a manner in which the screen holding member 102 inclines (lowers) near respective ends of side portions of the screen body 101 differs from a manner in which the screen holding member 102 inclines at a central portion of the screen body 101. For this reason, a difference is caused between an amount by which the side portions of the screen body 101 are pulled upward and an amount by which the central portion of the screen body 101 is pulled upward, thus leading to formation of wrinkles in the screen body 101. Specifically, wrinkles 105 (4 to 6 mm high) problematically occur in the form of a truncated V shape in the central portion of the screen body 101 as shown in FIGS. 28(*c*) and 28(*d*). In the case of the method (6), the more the expansion wires 103 are tensioned, the more a difference increases between an angle of the screen holding member 102 at the side portions of the screen body 101 and an angle of the screen holding member 102 at the central portion of the screen body 101, thus leading to formation of the wrinkles. Moreover, partial tensioning that is outward with respect to an upper portion of the screen body 101 causes vertical rolled wrinkles (curled wrinkles) along respective sides of the screen body 101.

With the method (7) (illustrated by FIGS. 24(*a*), 24(*b*) and 24(*c*)), a central portion of the screen body 111 is where weight of the screen body 111 itself concentrates, so that a screen holding member curves, whereby the central portion of the screen body 111 lowers as compared with both ends of the screen body 111. Force with which the wire 113 or the like is fixed relatively to the crossbar is applied at one point of the crossbar that is mounted with the screen holding member, so that the screen holding member's portions that are near respective parts where the wires 113 are respectively secured have their inclination (height) unchanged. As such, a height difference is caused among the end portions of the screen holding member and a central portion of the screen holding member, whereby the screen body 111 lowers to varying degrees. For this reason, the more the screen holding member holding the screen body 111 that is formed as a single sheet is tensioned, the larger wrinkles get. Consequently, flatness is problematically difficult to obtain according to stretching/shrinkage of the screen body 111. Moreover, formation of the connecting members 112 and addition of a wire winding mechanism are required, thus structurally complicating a screen apparatus and problematically causing inevitable increase in cost. Inevitable occurrence of wrinkles is a problem intrinsic even in the method (8) (illustrated by FIGS. 25(*a*) and 25(*b*)) and the method (9) (illustrated by FIG. 25(*c*)).

With the method (10) (illustrated by FIG. 26), the upper crossbar 143 of the floorstanding screen apparatus is structurally supported at two positions by supports erected from the roll-up device 144 (refer to FIG. 29) that is in a lower position, so that horizontality of the crossbar 143 is not obtained. Since pulling force of a lower crossbar 145 is stronger, a difference is caused between an amount of expanding force directed toward both edges of the upper crossbar 143 and an amount of vertically applied force. Consequently, wedge-shaped wrinkles 146 problematically occur below the upper crossbar 143, and perpendicular wrinkles 147 problematically occur in the entire screen body 141. Moreover, curled wrinkles 148 occur along respective sides of the screen body 141. Here, the wrinkles 147 reach a height of 8 to 10 mm.

As described above, the wrinkles occur in the screen body of any one of the conventional screen apparatuses, thereby causing distortion in an image that is projected onto the screen body, such as the one shown in FIG. 30 (a screen test image).

The present invention has been made in view of the above problems, and an object of the present invention is to provide a low-cost screen apparatus capable of realizing, with its simple mechanism, a method of obtaining flatness of a screen body that has been difficult to realize with expansion using an upper and a lower crossbar for support.

SUMMARY OF THE INVENTION

To achieve the above object, a screen apparatus according to a first aspect of the present invention includes:

a crossbar having a tubular shape, the crossbar being provided to an upper end of a screen body and being configured to suspend and roll up the screen body; and a holding member disposed inside the crossbar, the holding member holding the upper end of the screen body, wherein the holding member is formed of at least three divisions including:

a left-end-part holding member disposed on a left-end side of the crossbar, the left-end-part holding member holding a left end part of the screen body and being configured to pull the screen body axially of the crossbar toward a left end of the crossbar;

a right-end-part holding member disposed on a right-end side of the crossbar, the right-end-part holding member holding a right end part of the screen body and being configured to pull the screen body axially of the crossbar toward a right end of the crossbar; and a central-part holding member disposed between the left-end-part holding member and the right-end-part holding member, the central-part holding member holding a central part of the screen body.

According to a second aspect of the present invention, it is preferable in the first aspect that the central-part holding member be divided into a plurality of holding pieces, and it is also preferable in the first aspect that the screen body's upper end held by the central-part holding member maintain its upper positions and lower positions horizontal without being affected by tension of the left-end-part holding member and tension of the right-end-part holding member.

According to a third aspect of the present invention, it is preferable in the second aspect that the crossbar be internally provided with a recess that accommodates the left-end-part holding member, the right-end-part holding member, the central-part holding member, and the screen body's upper end held by these holding members, and the recess is preferably formed so that when viewed in cross section, respective long sides of the left-end-part holding member, the right-end-part holding member, and the central-part holding member assume an inclined position as the screen body having its upper end accommodated by the recess moves under its own weight.

According to a fourth, a fifth and a sixth aspect of the present invention, it is preferable in the first through third aspects that the left-end-part holding member and the right-end-part holding member each include a pull holder that is plate-shaped and holds the screen body, a pull piece adhesively fixed to an end of the pull holder, a bolt connected to an end of the pull piece via a joint, and a nut that is screwed on the bolt and gives tension to the bolt by being rotated. According to a seventh aspect of the present invention, it is preferable in this case that a nut receiving member be disposed on a side where the nut moves relatively to the bolt when tightened, take a tightening load from the nut and generate urging force sidewise of and outwardly of the screen body.

According to the present invention, the holding member holding the upper end of the screen body includes the three divisions axially of the crossbar, so that a slight stretch or a slight shrink of the screen body can be distributively absorbed by the holding members as a whole. Moreover, slight tensioning from both sides for expansion with the three divided holding members having their respective surfaces attached to the screen body can fix even a difference between respective expansion/contraction ratios of the screen body and the crossbar by rendering a difference between expansion/contraction distances surface stretches or surface shrinks of the screen body. Consequently, wrinkles can be prevented from occurring in the screen body. Furthermore, the central part of the screen body is free from left and right tensionings, so that the central-part holding member is unaffected by inclinations of the holding members that are pulled leftward and rightward, respectively and thus functions solely for holding against the weight of the screen body, whereby flatness of the screen body can be maintained.

According to the structure of the second aspect of the present invention, when tensioned for expansion, the left-end-part holding member and the right-end-part holding member are pulled leftward and rightward, respectively without being affected by lowering force caused by the weight of the screen body, whereby the screen body is moved leftward and rightward without deformation of the left-end-part and right-end-part holding members. The leftward and rightward expansion of the screen body can thus be carried out with the screen body's upper end held by the central-part holding member maintaining its upper positions and lower positions horizontal. Consequently, the screen body can be expanded with the flatness maintained.

According to the structure of the third aspect of the present invention, expanding force that is a resultant of leftward and rightward tensions and vertical height maintaining force against the weight of the screen body can be applied in the recess formed inside the crossbar, whereby wrinkles can be prevented reliably from occurring.

With the structure of each of the fourth through sixth aspects of the present invention, the tension that can be placed on the screen body is fine and accurate. When the screen body is suspended (expanded), the holding member inclines under the weight of the screen body. When the screen body is stored (rolled up), the holding member does not bear the weight of the screen body, thus rising slightly from its inclined position. The joints are required in order for the holding member to finely incline even though the holding member is tensioned from the left as well as from the right. In the present invention, the holding member can cope with the above change of load on the screen body that is repeated routinely.

According to the structure of the seventh aspect of the present invention, the urging force is transmitted from the nut receiving member through the nut to the bolt, whereby the bolt, together with the nut, is urged sidewise of and outwardly of the screen body. Even when the screen body slightly stretches horizontally, resulting from, for example, long-term repetition of variations in temperature and humidity in long-term use, the bolts, together with the corresponding nuts, are moved sidewise of and outwardly of the screen body by a stretch amount of the screen body with the screen body being tensioned outwardly and horizontally. This means that even when the screen body slightly stretches horizontally with use, the stretch amount is absorbed, whereby the tensioning can be maintained.

BRIEF DESCRIPTION OF DRAWINGS

FIG. 2(a) schematically shows a holding member holding a screen body, while FIG. 2(b) illustrates structural details of the holding member;

FIG. 6(a) illustrates structural details of a holding member of a screen apparatus according to another exemplary embodiment of the present invention, while FIG. 6(b) is a partial perspective view of a crossbar and the holding member;

FIGS. 17(a) and 17(b) are longitudinal sectional views of an essential portion that is partially broken, illustrating the example (4) of the holding member pull mechanism, with FIG. 17(a) illustrating screen tensioning in an initial stage of the screen body's use and FIG. 17(b) illustrating screen tensioning after absorption of a horizontal stretch of the screen body;

FIGS. 25(a) to 25(c) illustrate methods of expanding a screen body of a screen apparatus, with FIGS. 25(a) and 25(b) showing a conventional example (8) and FIG. 25(c) showing a conventional example (9);

FIG. 27(a) illustrates wrinkles caused to the screen apparatus of the conventional example (1), while FIGS. 27(b) and 27(c) illustrate wrinkles caused to each of the screen apparatuses of the conventional example (2);

FIGS. 28(a) and 28(b) illustrate wrinkles caused to each of the screen apparatuses of the conventional example (5), while FIGS. 28(c) and 28(d) illustrate wrinkles caused to the screen apparatus of the conventional example (6);

DETAILED DESCRIPTION

Concreate exemplary embodiments of a screen apparatus according to the present invention are described next with reference to the accompanying drawings.

Figure 1:
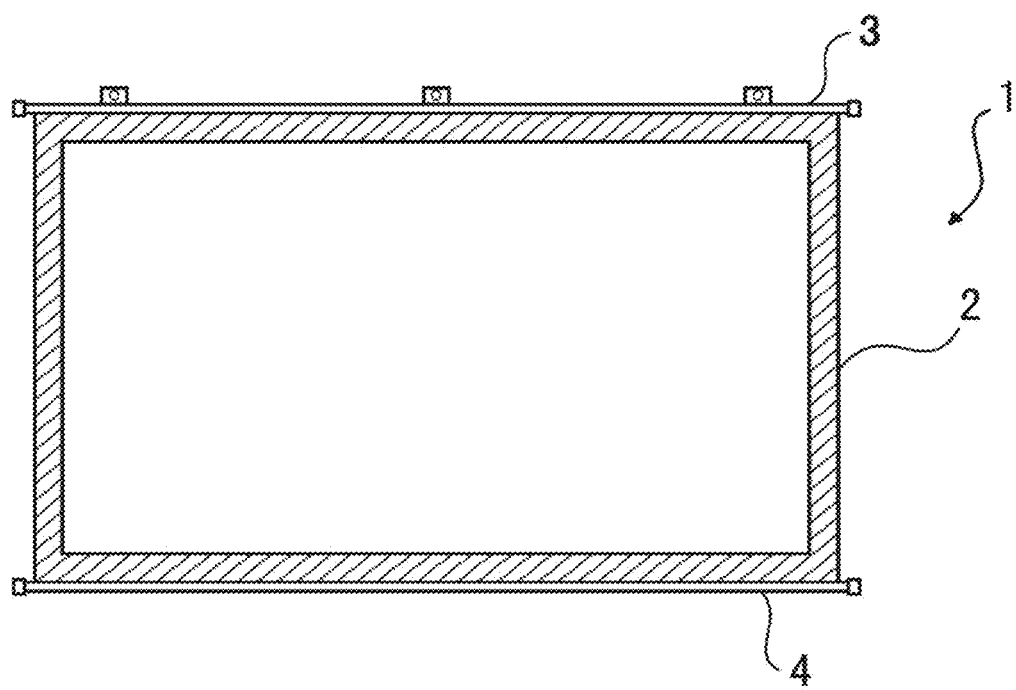
FIG. 1 is a front view of a screen apparatus applied as a suspended screen apparatus of a hanging scroll type according an exemplary embodiment of the present invention.
Figure 3:
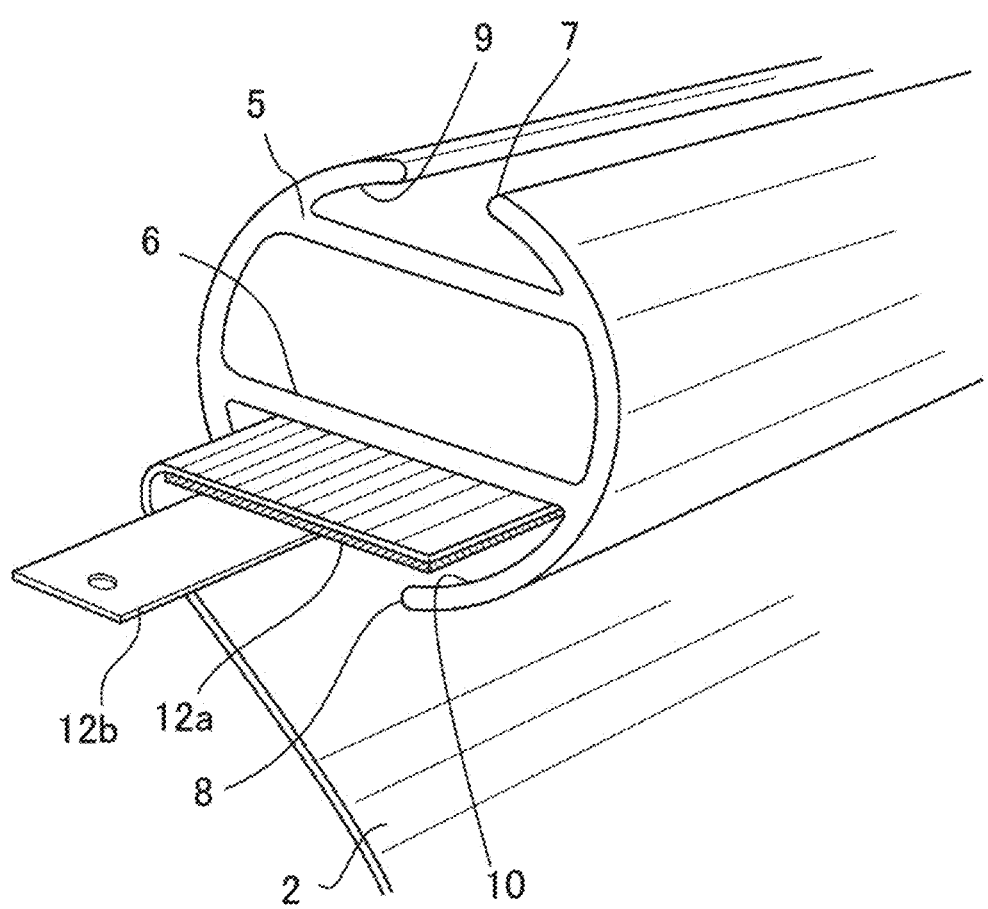
FIG. 3 is a partial perspective view of a crossbar and the holding member.
Figure 4:
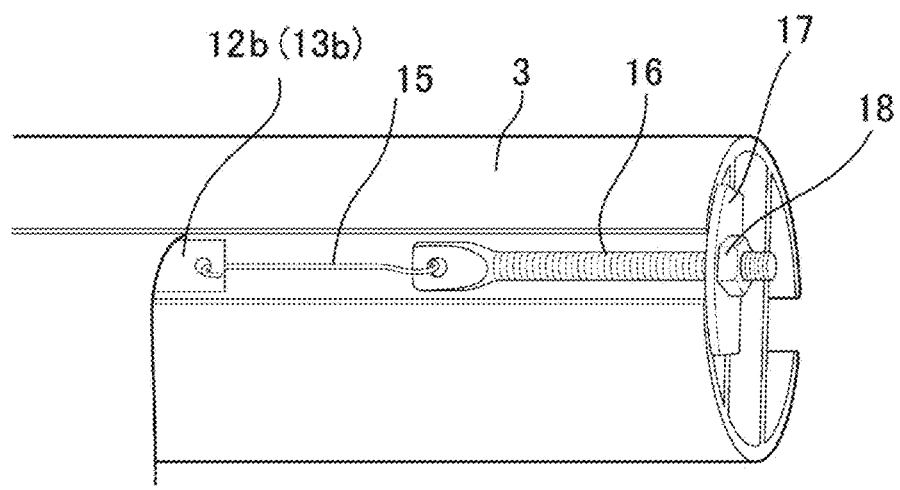
FIGS. 4(a) and 4(b) are respectively a partially broken view in perspective of and an exploded view of a holding member pull mechanism.
Figure 4:
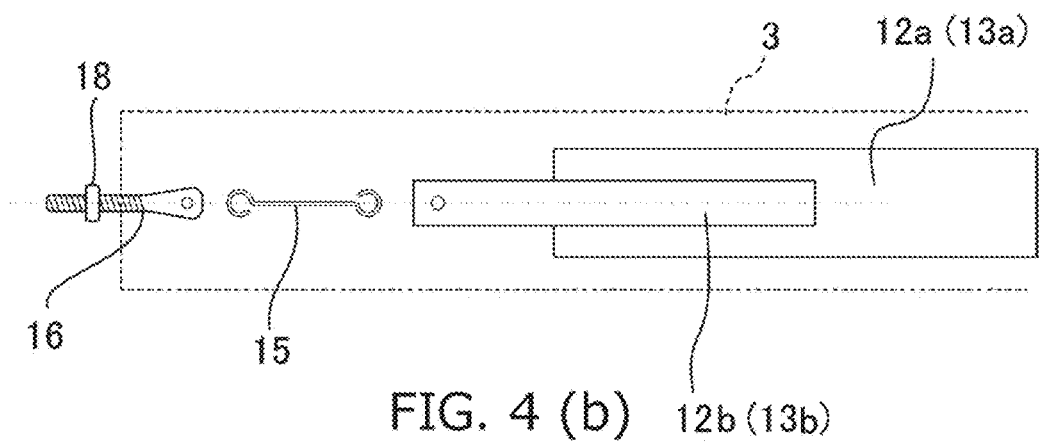

FIG. 1 is a front view of a screen apparatus applied as a suspended screen apparatus of a hanging scroll type according an exemplary embodiment of the present invention. FIG. 2(a) schematically shows a holding member holding a screen body with the holding member disposed inside a crossbar, while FIG. 2(b) illustrates structural details of the holding member. FIG. 3 is a partial perspective view of the crossbar and the holding member, and FIGS. 4(a) and 4(b) are respectively a partially broken view in perspective of and an exploded view of a holding member pull mechanism.

The screen apparatus 1 according to the present exemplary embodiment includes, as shown in FIG. 1, a screen body 2 that is substantially rectangular, an upper crossbar 3 that is tubular and is disposed along an upper end of the screen body 2, and a lower crossbar 4 that is tubular and is disposed along a lower end of the screen body 2. The screen body 2 is held by having its upper end inserted into the upper crossbar 3. The upper crossbar 3 is hung on a wall or from a ceiling, whereby the screen body 2 is expanded for movie projection or image projection by a projector. It is to be noted here that the upper crossbar 3 and the lower crossbar 4 have substantially the same structure, so that only the structure of the upper crossbar 3 (hereinafter referred to simply as "crossbar 3") is described hereinafter as a representative.

As shown in FIG. 3, the crossbar 3 is formed of an aluminum extruded structure, is tubular overall and has such a shape as to be internally formed with partition walls 5, 6 extending longitudinally in parallel relationship and to be formed with, on respective outer sides of the partition walls 5, 6, openings (slits) 7, 8 extending longitudinally, whereby an upper recess 9 is defined between the partition wall 5 and the opening 7, while a lower recess 10 is defined between the partition wall 6 and the opening 8. Here, the lower recess 10 serves as an internal space of the crossbar 3 where the screen body 2 and a screen holding member 11 are held.

Figure 2:
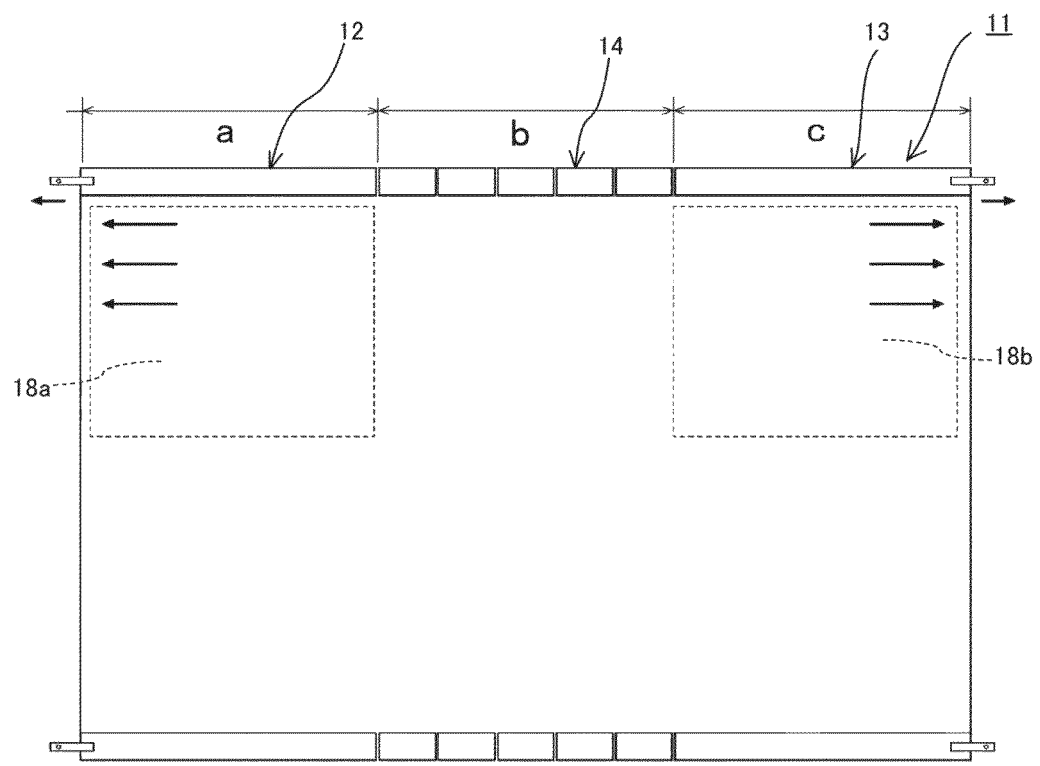
Figure 2:
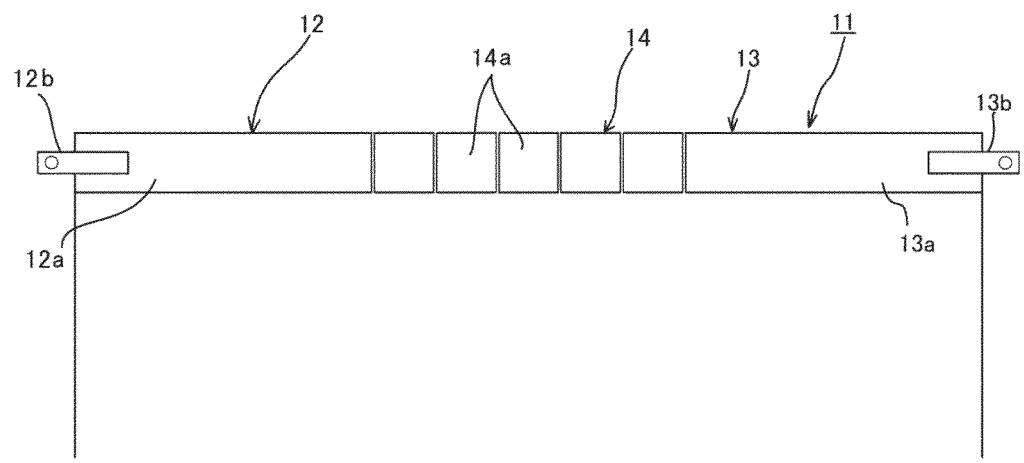

As shown in FIG. 2, the screen holding member 11 is formed of three divisions including a left-end-part holding member 12 disposed on a left-end side of the crossbar 3, a right-end-part holding member 13 disposed on a right-end side of the crossbar 3, and a central-part holding member 14 disposed between the left-end-part holding member 12 and the right-end-part holding member 13. The left-end-part holding member 12, the right-end-part holding member 13, and the central-part holding member 14 each have a length longitudinally of the crossbar 3 that is substantially one third of a width (i.e., a length of the upper end) of the screen body 2 (meaning that a:b:c=1:1:1). It is to be noted that the respective lengths of the left-end-part holding member 12 and the right-end-part holding member 13 may each be set slightly greater than the length of the central-part holding member 14 (for example, the length of each of the left-end-part and the right-end-part holding members 12, 13 ranges from 700 to 1,200 mm when the width of the screen body 2 is 2 m).

The central-part holding member 14 is longitudinally divided into a plurality of (five in the drawing) height-maintaining holding pieces 14a. The height-maintaining holding pieces 14a are attached to the upper end of the screen body 2 and function to maintain a height of the screen body 2 without being affected by tension of the left-end-part holding member 12 and tension of the right-end-part holding member 13. Here, the height-maintaining holding pieces 14a each have a length longitudinally of the crossbar 3 that ranges, for example, from 200 to 400 mm.

On the other hand, the left-end-part holding member 12 and the right-end-part holding member 13 are attached to the screen body 2 independently of the central-part holding member 14 and include respective pull holders 12a, 13a that function to pull the screen body 2 mainly toward respective left and right ends of the crossbar 3 and function to maintain the height of the screen body 2, and respective pull pieces (pull fittings) 12b, 13b respectively fixed to respective ends of the pull holders 12a, 13a by an adhesive. More specifically, the height-maintaining holding pieces 14a are joined to the upper end of the screen body 2 along a central part of the overall width of the screen body 2, and the pull holders 12a, 13a are joined to the upper end of the screen body 2 along respective left and right end parts of the overall width of the screen body 2. As shown in FIGS. 4(a) and 4(b), a bolt 16 is connected to an end of each of the pull pieces 12b, 13b via a joint 15 made from a piano wire, is passed through a nut fastener 17 disposed on an end face of the crossbar 3 and is screwed into a nut 18. With the upper end of the screen body 2 thus having the height-maintaining holding pieces 14a of the central-part holding member 14 and the respective pull holders 12a, 13a of the left-end-part and right-endpart holding members 12, 13 attached thereto, the upper end of the screen body 2 is inserted in the lower recess 10 of the crossbar 3, whereby the screen body 2 is held by the crossbar 3 to be suspended. It is to be noted here that the recess 10 is provided with such space as to allow the pull holders 12a, 13a to incline under the weight of the screen body 2.

As the nuts 18 are tightened with the screen body 2 thus suspended from within the recess 10 of the crossbar 3, leftward and rightward tensions from the respective pull holders 12a, 13a are given to the screen body 2 held by the left-end-part and right-end-part holding members 12, 13 through the respective bolts 16, the respective joints 15 and the respective pull pieces 12b, 13b.

Wrinkles that might occur in the screen body 2 normally have a property of getting larger as the screen body 2 slightly stretches or shrinks, so that in the screen apparatus 1 of the present exemplary embodiment, the left-end-part holding member 12 and the right-end-part holding member 13 have such a structure that the tensions given by these holding members 12, 13 enable precise expansion equivalent to a distance of about 1 to 2 mm, whereas the central-part holding member 14 has such a structure as to support downward tension caused by the weight of the screen body 2. With the three divided holding members 12, 13, 14 having their surfaces attached to the upper end of the screen body 2, the slight tensions respectively given from both sides, that is to say, by the left-end-part holding member 12 and the right-end-part holding member 13 for expansion of the screen body 2 can fix even a difference between respective expansion/contraction ratios of the screen body 2 and the crossbar 3 by rendering a difference between expansion/contraction distances stretches or shrinks of surfaces (refer to areas 18a, 18b in FIG. 2(a)) each corresponding to substantially one third of the overall width of the screen body 2 through distributive absorption by the holding members 12, 13, 14 as a whole. Consequently, the wrinkles can be prevented from occurring. In this case, a central part of the screen body 2 is free from left and right tensionings, so that the height-maintaining holding pieces 14a are unaffected by respective inclinations of the pull holders 12a, 13a that are pulled and thus act solely as forces that hold against the weight of the screen body 2, whereby flatness of the screen body 2 is maintained.

It is to be noted here that the height-maintaining holding pieces 14a have their height set according to a hanging height of the screen body 2, while the left and right pull holders 12a, 13a have their heights set lower than the height of the height-maintaining holding pieces 14a according to the leftward and rightward tensions.

According to the screen apparatus 1 of the present exemplary embodiment, when tensioned for expansion of the screen body 2, the left and right pull holders 12a, 13a are pulled leftward and rightward, respectively without being affected by lowering force caused by the weight of the screen body 2, whereby the screen body 2 can be moved leftward and rightward without deformation of the pull holders 12a, 13a. The leftward and rightward expansion of the screen body 2 is carried out while the height-maintaining holding pieces 14a maintain their horizontal condition. Consequently, the screen body 2 can be expanded with the flatness maintained.

In the description of the present exemplary embodiment, the left-end-part holding member 12, the right-end-part holding member 13, and the central-part holding member 14 have been disposed on the upper end of the screen body 2 inside the upper crossbar 3. However, an effect of expansion of the screen body 2 can be exerted more reliably by disposing additional holding members 12, 13, 14 inside the lower crossbar 4.

Figure 5:
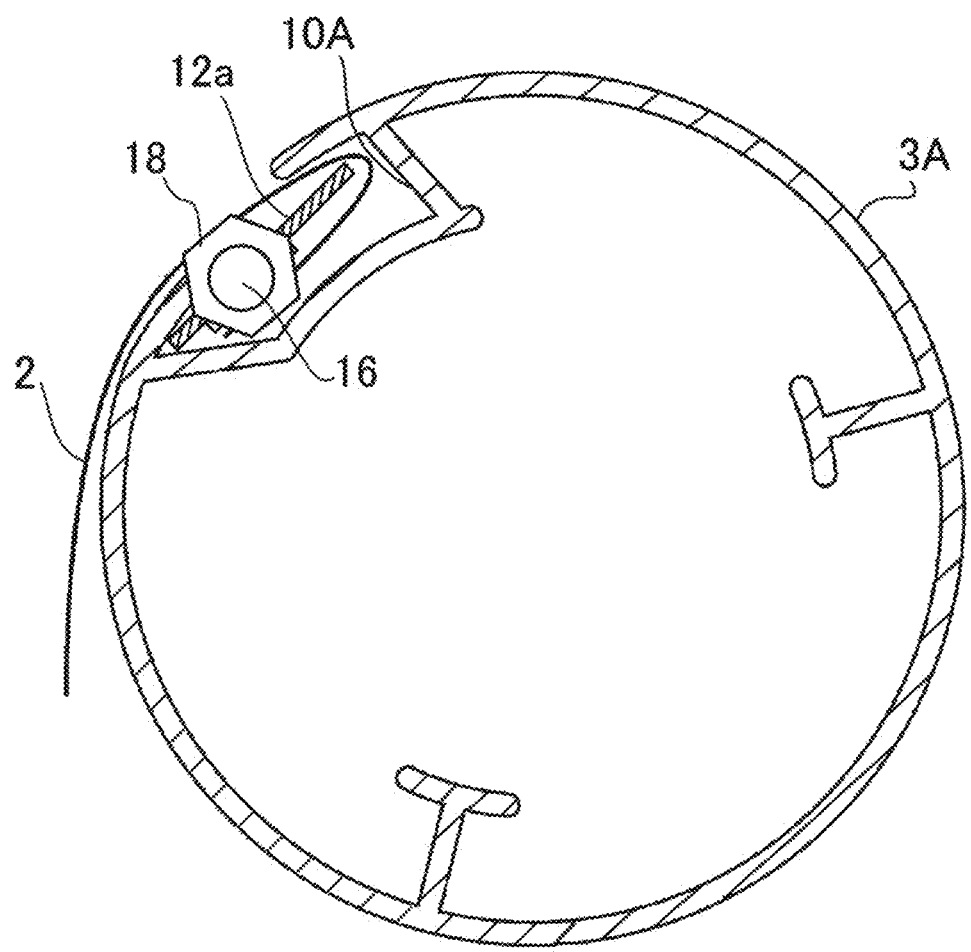
FIG. 5 is a sectional view illustrating a holding member pull mechanism in a modification of the exemplary embodiment.

FIG. 5 is a sectional view illustrating a holding member pull mechanism in a modification of the present exemplary embodiment. In this modification, a winding drum 3A of a suspended screen apparatus is applied to a roll-up screen apparatus in which a screen body 2 is rolled up by means of a winding device formed of an electric motor or a spring.

In this modification, the winding drum 3A is internally formed with a recess 10A. As in the case of the above exemplary embodiment, pull holders 12a, 13a attached to the screen body 2 are inserted in the recess 10A, and flatness of the screen body 2 is maintained by tension that is well-balanced between tensions obtained by pulling the screen body 2 leftward and rightward and height maintaining force that maintains a height of the screen body 2 against downward tension caused by the weight of the screen body 2. This modification is similar to the above exemplary embodiment in that the screen holding member 11 is formed of a left-end-part holding member 12, a right-end-part holding member 13, and a central-part holding member 14.

Even in this modification, when the screen body 2 is caused by environmental changes to stretch or shrink, the screen body 2 expands leftward and rightward under the leftward and rightward tensions, and the pull holders 12a, 13a move together with the screen body 2. Here, the screen body 2 moves horizontally leftward and rightward because of a height difference among the left and right pull holders 12a, 13a and the height-maintaining holding pieces 14a as well as because a central part of the screen body 2 is not pulled leftward and rightward. The screen body 2 thus expands horizontally in the vicinity of the winding drum 3A, whereby the flatness of the screen body 2 is obtained. In addition, the screen body 2 is rolled up to wind around the winding drum 3A while maintaining its flatness. In a small internal space of the winding drum 3A, the expanding force that is a resultant of the leftward and rightward tensions and the vertical height maintaining force against the weight of the screen body 2 can be added, whereby wrinkles can be prevented from occurring.

In the present exemplary embodiment, those used for the pull holders 12a, 13a and the height-maintaining holding pieces 14a include a short-glass-fiber-filled composite plate based on epoxy resin or phenol resin that has good environmental stability, and a plate that is based on polycarbonate, polyamide, polyacetal, or vinyl chloride and has a linear expansion coefficient of not more than 3 to $4 \times 10^{-5}/°$ C. and a tensile strength of not less than 4.5 kg/mm$^2$.

Figure 6:
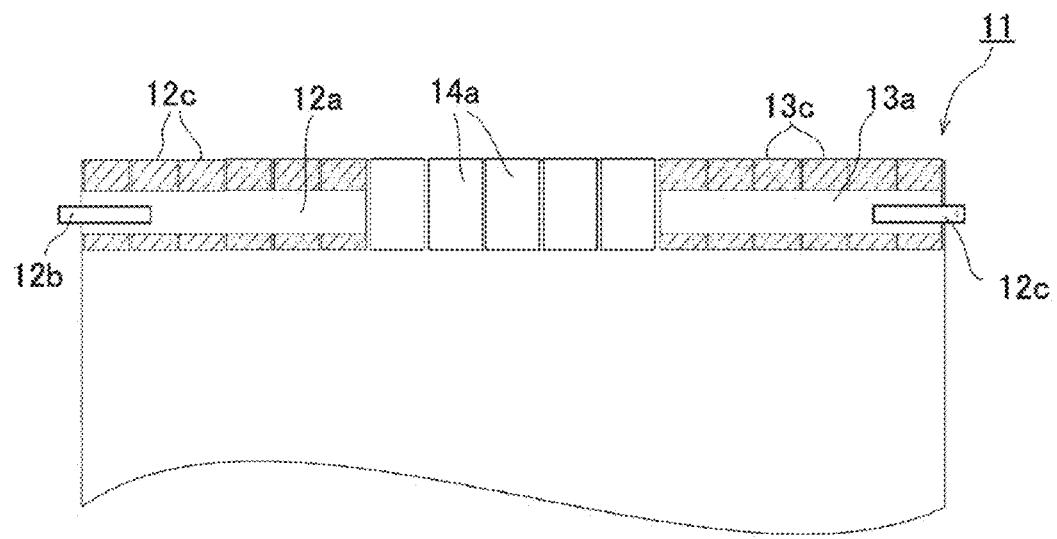
Figure 6:
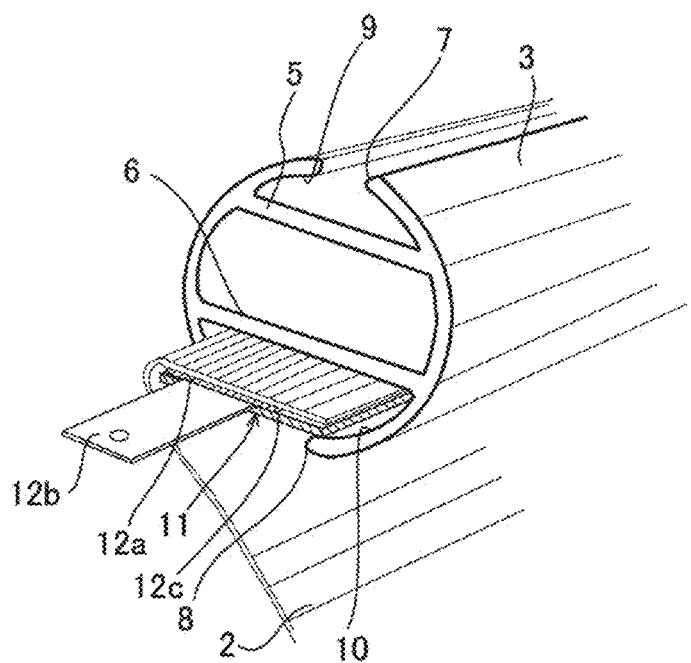

FIG. 6(a) illustrates structural details of a holding member of a screen apparatus according to another exemplary embodiment of the present invention, while FIG. 6(b) is a partial perspective view of a crossbar and the holding member.

Figure 7:
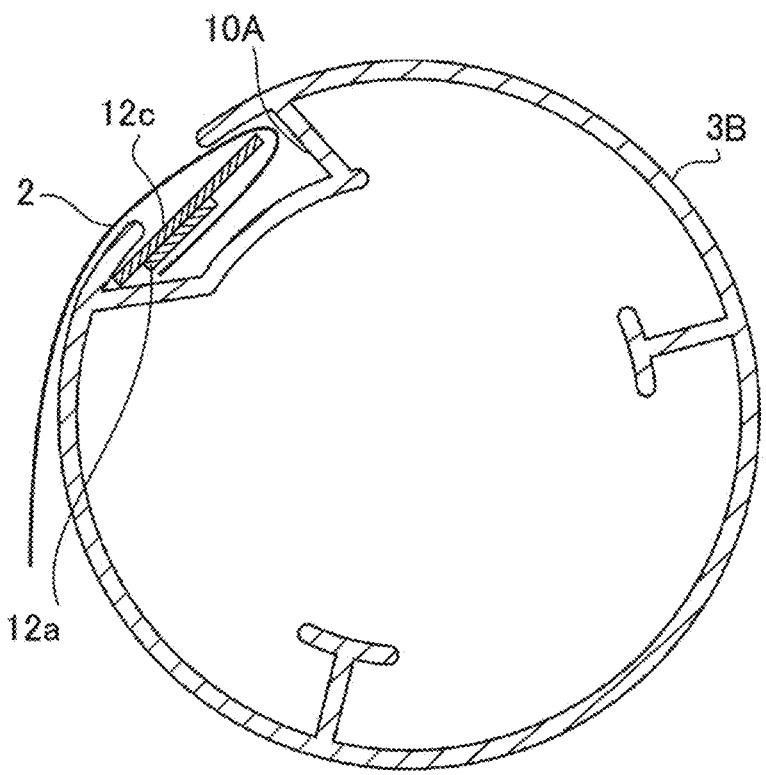
FIGS. 7(a) and 7(b) are respectively a sectional view and a partially enlarged view of a holding member pull mechanism in a modification of the other exemplary embodiment.
Figure 7:
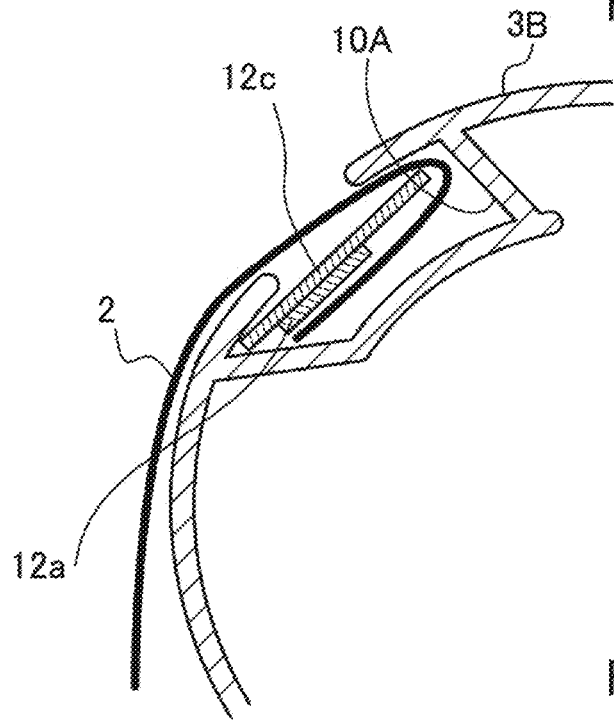

In this exemplary embodiment, a left-end-part holding member 12 and a right-end-part holding member 13 include respective pull holders 12a, 13a that function to pull a screen body 2 leftward and rightward, respectively, height-maintaining holding pieces 12c, 13c that function to maintain a height of the screen body 2, and respective pull pieces 12b, 13b respectively fixed to respective ends of the pull holders 12a, 13a. Similarly to height-maintaining holding pieces 14a of a central-part holding member 14, the height-maintaining holding pieces 12c are multiple (six in the drawing) longitudinally divided pieces, and the height-maintaining holding pieces 13c are multiple (six in the drawing) longitudinally divided pieces. FIGS. 7(a) and 7(b) are respectively a sectional view and a partially enlarged view of a holding member pull mechanism in a modification of this exemplary embodiment. This exemplary embodiment and the modification thereof differ from the foregoing exemplary embodiment and the modification of the foregoing exemplary embodiment only in that the left-end-part and right-end-part holding members 12, 13 have such a function that the respective pull holders 12a, 13a pull the screen body 2 leftward and rightward, respectively and such a separate function that the height-maintaining holding pieces 12c, 13c maintain the height of the screen body 2, and their fundamental effects do not differ from those of the foregoing exemplary embodiment and the modification thereof. Accordingly, the fundamental effects will not be detailed.

The applicant of the present invention has studied a mechanism of wrinkles that occur in a screen body that is suspended from a crossbar when used. According to the study, a material used for the screen body was affected by variations in temperature and humidity in a place where a screen apparatus was used as well as seasonal variations and thus stretched or shrank, whereby a dimensional difference was caused between a rod-shaped screen supporting member (such as the crossbar or a winding drum) fixing the screen body and the screen body. It was found that wrinkles appeared in the screen body. This is because the screen supporting member had greater strength than the screen body.

Figure 8:
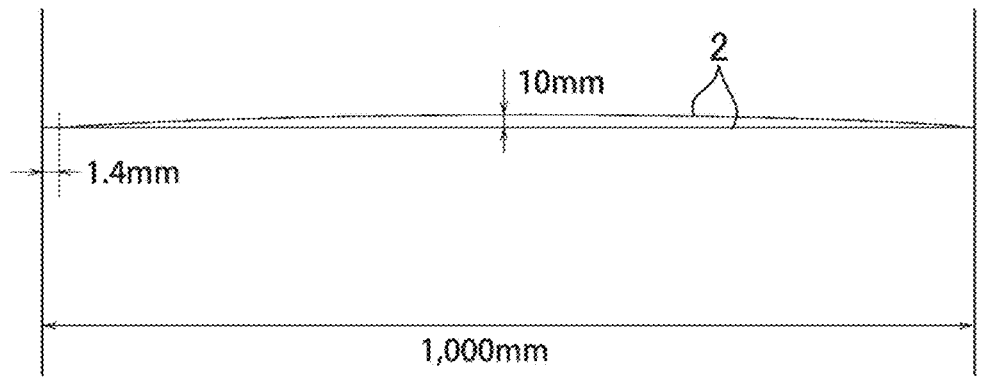
FIGS. 8(a) and 8(b) provide an illustration (1) of an occurrence mechanism of wrinkles in a screen body.
Figure 8:
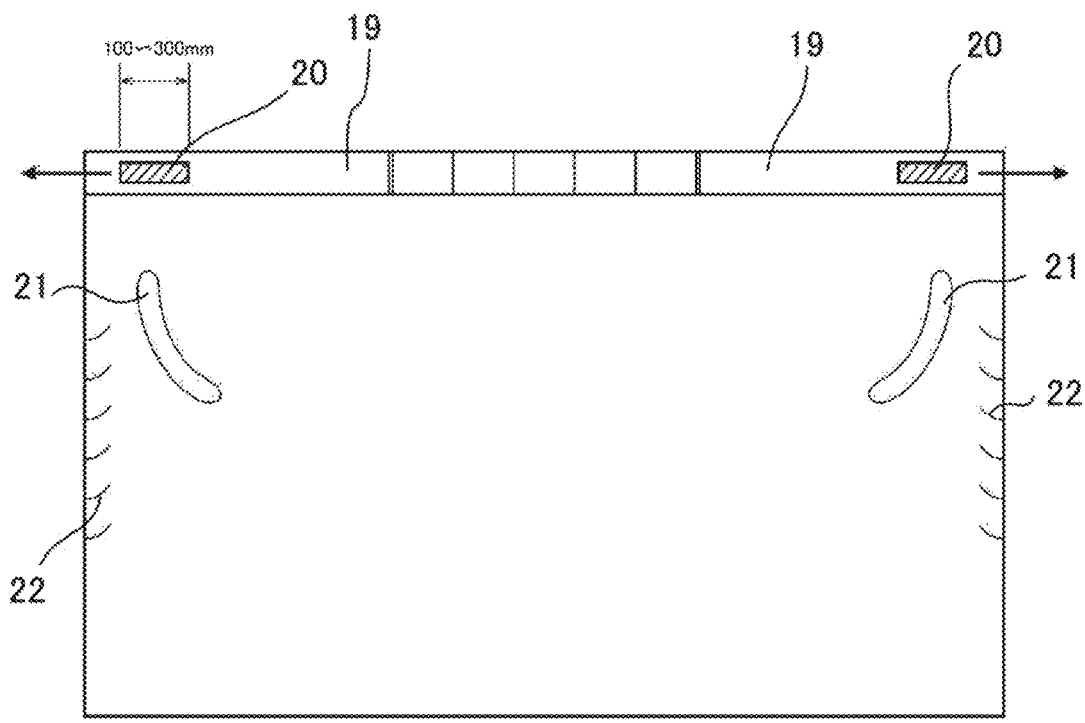

There is a great numeric relationship between the screen body's stretch amount along a plane and a wrinkle amount (wrinkle height). In other words, as shown in FIG. 8(a), when a 1,000-mm-wide screen body 2 shortens 1.4 mm along the plane, a 10-mm-tall wrinkle appears. The same goes for cases where the 1,000-mm-wide screen body 2 stretches 1.4 mm, meaning that a 10-mm-tall wrinkle occurs when this screen body 2 is fixed along its 1,000-mm width.

In cases where a joining area 20 where a holding member 19 and a screen body 2 are joined together is 100 mm to 300 mm long as shown in FIG. 8(b), a left and a right end of the screen body 2 are partly tensioned when the screen body 2 is pulled in opposite directions to be tensioned. In this way, the joining area 20 causes wrinkles. For this reason, the left-end and right-end joining areas 20 each need to have a length corresponding to at least one third of a width of the screen body 2 (or a length of 700 mm to 1,200 mm) in cases where the screen body 2 is tensioned. Having such a length, each of the joining areas 20 becomes a long surface to which the screen body 2 is joined. Note that it was found that when the screen body 2 was held to each joining area 20 that is 100 mm long and 17 mm high and was expanded, an inclined wrinkle 21 occurred in an upper corner portion of the screen body 2, while curled or rolled wrinkles 22 occurred along respective sides of the screen body 2.

Figure 9:
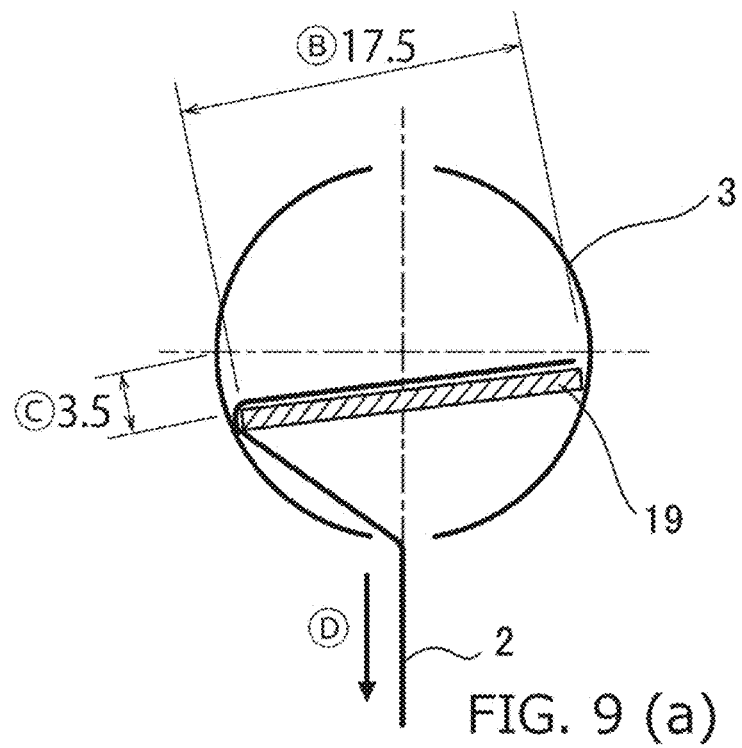
FIGS. 9(a) and 9(b) provide an illustration (2) of the occurrence mechanism of wrinkles in the screen body.
Figure 9:
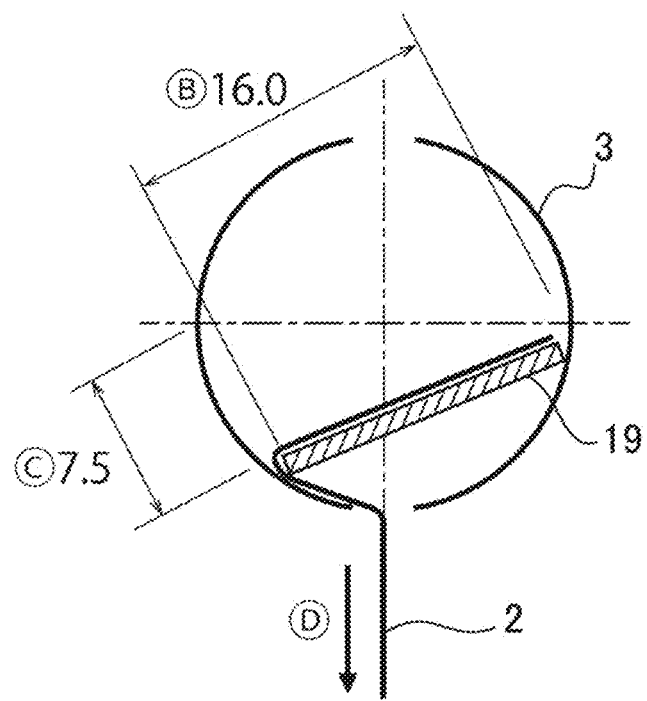

The reason why a conventional suspended screen apparatus in which a screen body held by a holding member is inserted into a crossbar and tensioned from both sides cannot obtain flatness lies in the following screen body's unique stretch/shrink mechanism inside the crossbar. As shown in Table 1, in cases where a crossbar (rod-shaped pipe) 3, in which a holding member 19 holding a screen body 2 is fixed, has an inside diameter (A) of 18.5 mm, when the holding member 19 attached to the screen body 2 and placed inside the crossbar 3 has a width (B) i.e., a long side as viewed in cross section, of 17.5 mm, a lowering amount (D) of the screen body 2 is 3.5 mm (refer to FIG. 9(a)). When the width (B) of the holding member 19 attached to the screen body 2 is 16.0 mm that is 2.5 mm shorter than the inside diameter (A), the lowering amount (D) of the screen body 2 is 7.5 mm (refer to FIG. 9(b)). It follows from this that when the width (B) of the holding member 19 is 17.5 mm as an initial width (position) at the time of production, a reduction in the holding member's width (B) of 1.5 mm causes the screen body 2 to lower by 4 mm. Because of such a width change of the holding member 19 inside the crossbar 3 that leads to an increase in the lowering amount of the screen body 2 and because of a small stretch/shrink amount of the screen body 2 that causes the wrinkle (in cases where the 1,000-mm-wide screen body 2 stretches 1.4 mm, the 10-mm-tall wrinkle occurs as shown in FIG. 8(a)), the flatness of the screen body 2 could not be obtained with the crossbar 3.

TABLE 1

| Ⓐ Inside Diameter of Crossbar | Ⓑ Width of Holding Member | Ⓒ Difference Between Ⓐ and Ⓑ | Ⓓ Lowering Amount of Screen Body |
|---|---|---|---|
| 18.5 | 18.3 | 0.2 | Holding Member Cannot be Inserted |
| 18.5 | 17.8 | 0.7 | 3.0 |
| 18.5 | 17.5 | 1.0 | 3.5 |
| 18.5 | 17.0 | 1.5 | 4.4 |
| 18.5 | 16.0 | 2.5 | 7.5 |

Conventionally, holding members are attached to an upper end of a screen body along an overall width of the screen body and are tensioned from both sides by, for example, respective wires. In this method, the outer holding members are angularly close to and parallel with a beam of a crossbar at their respective outer ends because the screen body is under strong tension at all times. However, the central holding member inside the crossbar is pulled downward under weight of the screen body and thus rotationally inclines. Such an inclination difference among the outer holding members and the holding member corresponding to a central part of the screen body inside the crossbar results in a height difference among these holding members, thereby causing wrinkles in the screen body based on the principle that a slight distance of shrinkage causes the wrinkles to get larger. As the leftward and rightward tensions are increased for prevention of the wrinkles, the outer holding members get closer to the bar-like beam in parallel relationship with the beam, while the holding member corresponding to the central part of the screen body that is 2 to 3 m long is straightened under the strong tension, thereby inclining under the weight of the screen body. The more the leftward and rightward tensions are increased, the more the outer holding members and the central holding member change angularly, thereby rendering the height difference among the holding members larger. Consequently, the wrinkles occur.

On the other hand, with the technique shown in the other exemplary embodiment, tensioning is carried out by a slight distance in an apparatus in which both ends of an end of the screen body have their respective long surfaces joined to the respective left-end-part and right-end-part holding members, and the left-end-part and right-end-part holding members are angularly unchanged when pulled. When the left-end-part and right-end-part holding members are tensioned, the tensions are transmitted gradually throughout an overall width of the screen body because the left-end-part and right-end-part holding members have their respective long surfaces joined. Accordingly, stretching/shrinkage is carried by the entire screen body. Since the holding members have the same inclination, downward tension is placed on the entire screen body in a horizontal manner. Consequently, vertically and horizontally balanced expansion can be effected by the addition of the slight leftward and rightward tensions and vertical expansion effected by weight of the screen body. Even in cases where expansion is effected by the upper crossbar and a lower crossbar, the vertically and horizontally balanced expansion can thus be realized, and the screen apparatus can provide superior flatness.

The exemplary embodiments of the screen apparatus according to the present invention have been described above. However, the structures described in the above exemplary embodiments are not restrictive of the present invention. Appropriate modifications of the structures can be made in the present invention without departing from the spirit of the present invention. For example, in place of the holding member pull mechanism of the above exemplary embodiment as shown in FIGS. 4(a) and 4(b), pull mechanisms shown in FIGS. 10 to 17 may each be adopted.

[Another Example (1) of Pull Mechanism]

Figure 10:
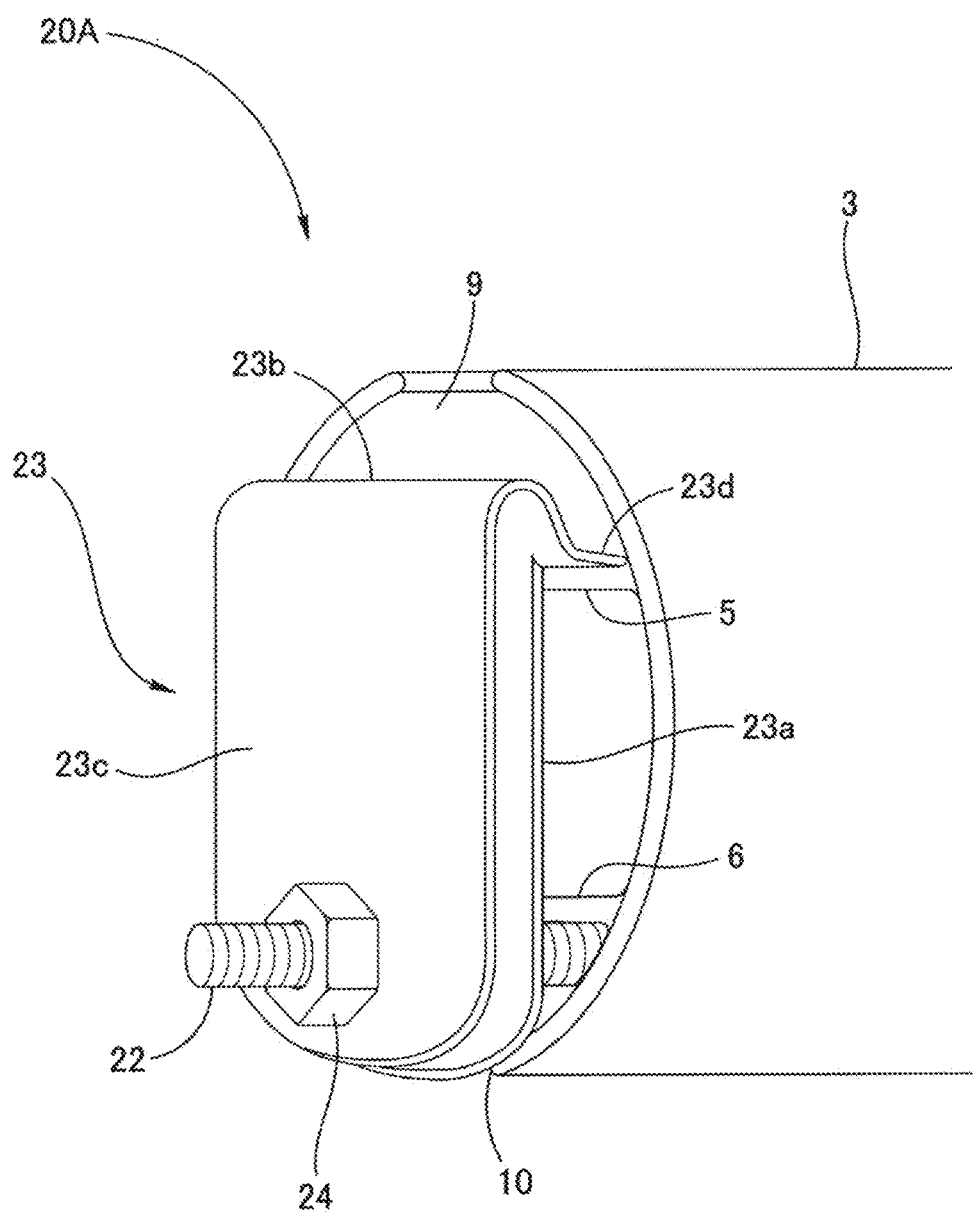
FIG. 10 is a partial perspective view illustrating another example (1) of the holding member pull mechanism.
Figure 11:
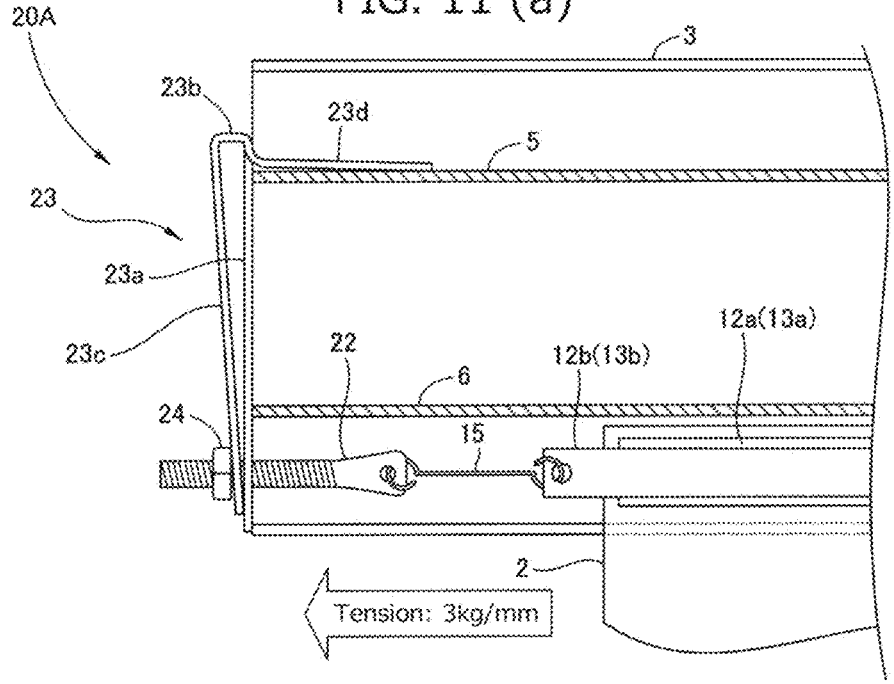
FIGS. 11(a) and 11(b) are longitudinal sectional views of an essential portion, illustrating the example (1) of the holding member pull mechanism, with FIG. 11(a) illustrating screen tensioning in an initial stage of the screen body's use and FIG. 11(b) illustrating screen tensioning after absorption of a horizontal stretch of the screen body.
Figure 11:
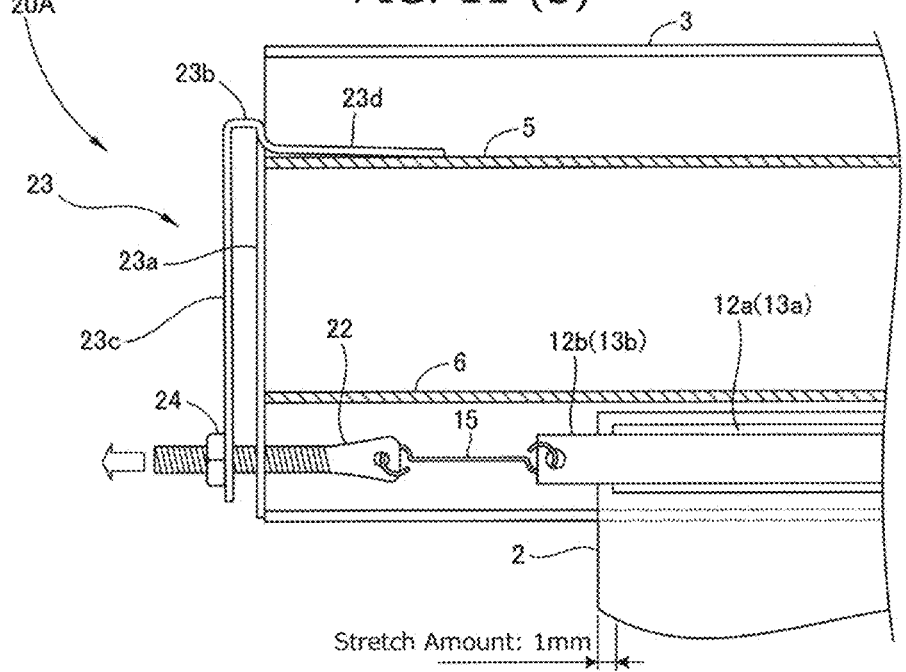

The pull mechanism shown in FIGS. 10, 11(a), and 11(b) includes an end plate 23 mounted to the end face of the crossbar 3. The end plate 23 is formed of a plate-shaped elastic member such as a plate spring material made of spring steel (SUP 10 or SK-5) or stainless steel (SUS304-CSP). This end plate 23 includes a tongue-shaped main member 23a fixedly abutting on the end face of the crossbar 3, a tongue-shaped nut receiving member 23c integrally connected to the main member 23a via a bend 23b to overlap the main member 23a, and a hook member 23d that extends between sides of the main member 23a from the bend 23b along a partition wall 5 and engages to hook on the partition wall 5.

The belt-shaped plate spring material having a thickness of, for example, about 0.3 to 0.4 mm is bent to have an inverted-U-shaped cross section, whereby the main member 23a and the nut receiving member 23c that engages the nut 18 face each other on respective sides across a given clearance in the end plate 23. A base end (upper end) of the nut receiving member 23c is a fixed end that is integrally connected to the main member 23a via the bend 23b, while a leading end (lower end) of the nut receiving member 23c is a free end that can freely move horizontally of the screen body 2 (axially of the crossbar 3).

The main member 23a is rendered perpendicularly planar so as to closely fit against the end face of the crossbar 3. The nut receiving member 23c is parallel with the main member 23a in natural condition without its elastic deformation, that is to say, under no tightening load from the nut 18. As a result of taking a tightening load from the nut 18, the nut receiving member 23c inclines sidewise of and inwardly of the screen body 2 through its elastic deformation (refer to FIG. 11(a)). In order to obtain such a spring characteristic as to generate an urging force of not more than 2 kg per 1 mm sidewise of and outwardly of the screen body 2, the nut receiving member 23c is appropriately shaped to include appropriate setting of a distance between a hole through which the bolt 16 passes and the bend 23b and appropriate setting of a width dimension. With such an extremely simple structure, the nut receiving member 23c can thus generate the urging force sidewise of and outwardly of the screen body 2.

An end of the bolt 16 is passed through the main member 23a and the nut receiving member 23c. The nut receiving member 23c is disposed on the side where the nut 18 moves relatively to the bolt 16 when tightened, thereby taking the tightening load from the nut 18. As the nuts 18 are tightened, the tensions are transmitted to the respective pull holders 12a, 13a through the respective bolts 16, the respective joints 15, and the respective pull pieces 12b, 13b, whereby the screen body 2 held by the left-end-part holding member 12 and the right-end-part holding member 13 is tensioned leftward and rightward.

When a tension of about 3 kg is placed on the screen body 2 as a result of being effected by a nut tightening amount that moves the nut 18 forward 1 mm relatively to the bolt 16, the nut receiving member 23c that is parallel with the main member 23a in the natural condition without its elastic deformation, that is to say, under no tightening load from the nut 18 is elastically deformed under the tightening load from the nut 18 because the urging force that the nut receiving member 23c generates is not more than 2 kg per 1 mm. The nut receiving member 23c thus bends angularly about the bend 23b so that its free end approaches a lower end of the main member 23a and is finally pushed against the lower end of the main member 23a. Consequently, as shown in FIG. 11(a), the nut receiving member 23c is inclined sidewise of and inwardly of the screen body 2 with respect to the main member 23a that is perpendicularly planar.

When the screen body 2 is under the tension in an initial stage of its use as shown in FIG. 11(a), flatness of the screen body 2 is maintained with the tension of about 3 kg acting sidewise of and outwardly of the screen body 2 as a result of being effected by the nut tightening amount that moves the nut 18 forward 1 mm relatively to the bolt 16.

There are cases where the screen body 2 slightly stretches horizontally with use, resulting from long-term repetition of variations in temperature and humidity. In these cases, the urging force from the nut receiving member 23c is transmitted to the bolt 16 through the nut 18, whereby the bolt 16, together with the nut 18, is urged sidewise of and outwardly of the screen body 2 as shown in FIG. 11(b). With the screen body 2 being tensioned outwardly and horizontally, the bolt 16, together with the nut 18, is moved sidewise of and outwardly of the screen body 2 by a stretch amount of the screen body 2. Consequently, even when the screen body 2 slightly stretches horizontally with use, the stretch amount is absorbed, whereby the tensioning can be maintained.

[Another Example (2) of Pull Mechanism]

Figure 12:
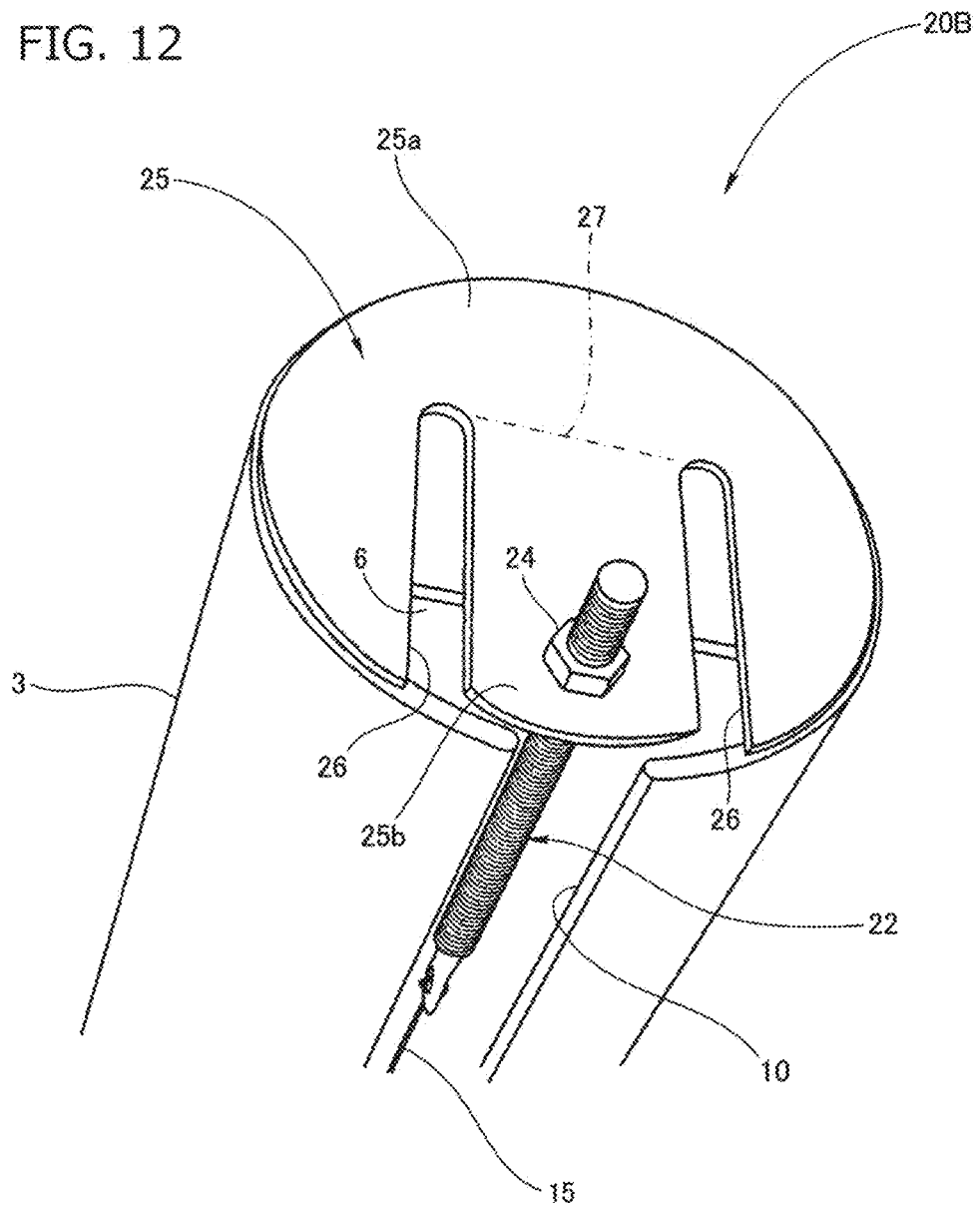
FIG. 12 is a partial perspective view illustrating another example (2) of the holding member pull mechanism.

In the pull mechanism shown in FIGS. 12, 13(a), and 13(b), an end plate 25 mounted to the end face of the crossbar 3 is formed of a plate-shaped elastic member such as a plate spring material made of spring steel (SUP 10 or SK-5) or stainless steel (SUS304-CSP). The entire end plate 25 is rendered substantially circular to be capable of substantial closure of the end face of the crossbar 3. This end plate 25 includes an inverted-U-shaped main member 25a fixedly abutting on the end face of the crossbar 3, and a tongue-shaped nut receiving member 25b supported by the main member 25a.

The circular plate spring material having a thickness of, for example, about 0.3 to 0.4 mm is provided with a pair of perpendicularly elongated notches 26 that is spaced to sandwich a diametrical position of the plate spring material and is open at one end (lower end) and closed at another end (upper end), whereby the main member 25a is formed outwardly of the pair of notches 26, while the nut receiving member 25b that engages the nut 18 is formed between the pair of notches 26 in the end plate 25. A base end (upper end) of the nut receiving member 25b is a fixed end that is integrally connected to the main member 25a via a bend 27, while a leading end (lower end) of the nut receiving member 25b is a free end that can freely move horizontally of the screen body 2 (axially of the crossbar 3).

The main member 25a is rendered perpendicularly planar so as to closely fit against the end face of the crossbar 3. The nut receiving member 25*b* is inclined sidewise of and outwardly of the screen body 2 in natural condition without its elastic deformation (refer to FIG. 13(*b*)), so that there is a predetermined clearance between the free end of the nut receiving member 25*b* and the end face of the crossbar 3 in the natural condition of the nut receiving member 25*b*. In order to obtain such a spring characteristic as to generate an urging force of not more than 2 kg per 1 mm sidewise of and outwardly of the screen body 2, the nut receiving member 25*b* is appropriately shaped to include appropriate setting of a distance between a hole through which the bolt 16 passes and the bend 27 and appropriate setting of a width dimension. With such an extremely simple structure, the nut receiving member 25*b* can thus generate the urging force sidewise of and outwardly of the screen body 2.

An end of the bolt 16 is passed through the nut receiving member 25*b*. The nut receiving member 25*b* is disposed on a side where the nut 18 moves relatively to the bolt 16 when tightened, thereby taking a tightening load from the nut 18. As the nuts 18 are tightened, the tensions are transmitted to the respective pull holders 12*a*, 13*a* through the respective bolts 16, the respective joints 15, and the respective pull pieces 12*b*, 13*b*, whereby the screen body 2 held by the left-end-part holding member 12 and the right-end-part holding member 13 is tensioned leftward and rightward.

When a tension of about 3 kg is placed on the screen body 2 as a result of being effected by a nut tightening amount that moves the nut 18 forward 1 mm relatively to the bolt 16, the nut receiving member 25*b* that is inclined in the natural condition is elastically deformed under the tightening load from the nut 18 because the urging force that the nut receiving member 25*b* generates is not more than 2 kg per 1 mm. The nut receiving member 25*b* thus bends angularly about the bend 27 so that its free end approaches the end face of the crossbar 3 and is finally pushed against the end face of the crossbar 3. Consequently, as shown in FIG. 13(*a*), the nut receiving member 25*b* becomes flush with the main member 25*a*.

Figure 13:
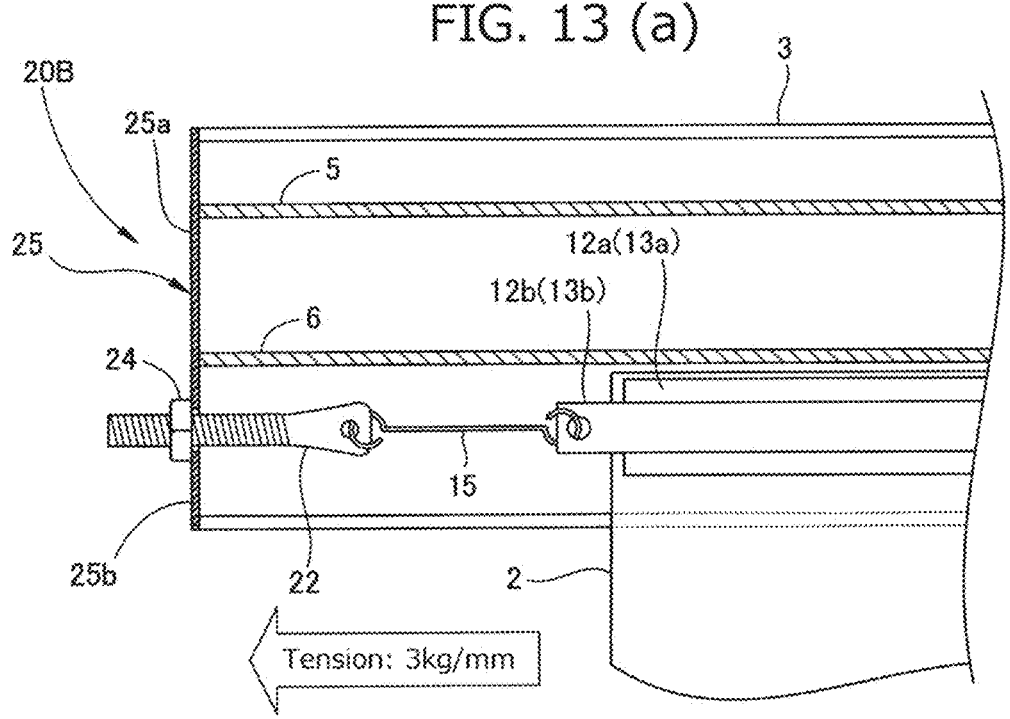
FIGS. 13(a) and 13(b) are longitudinal sectional views of an essential portion, illustrating the example (2) of the holding member pull mechanism, with FIG. 13(a) illustrating screen tensioning in an initial stage of the screen body's use and FIG. 13(b) illustrating screen tensioning after absorption of a horizontal stretch of the screen body.
Figure 13:
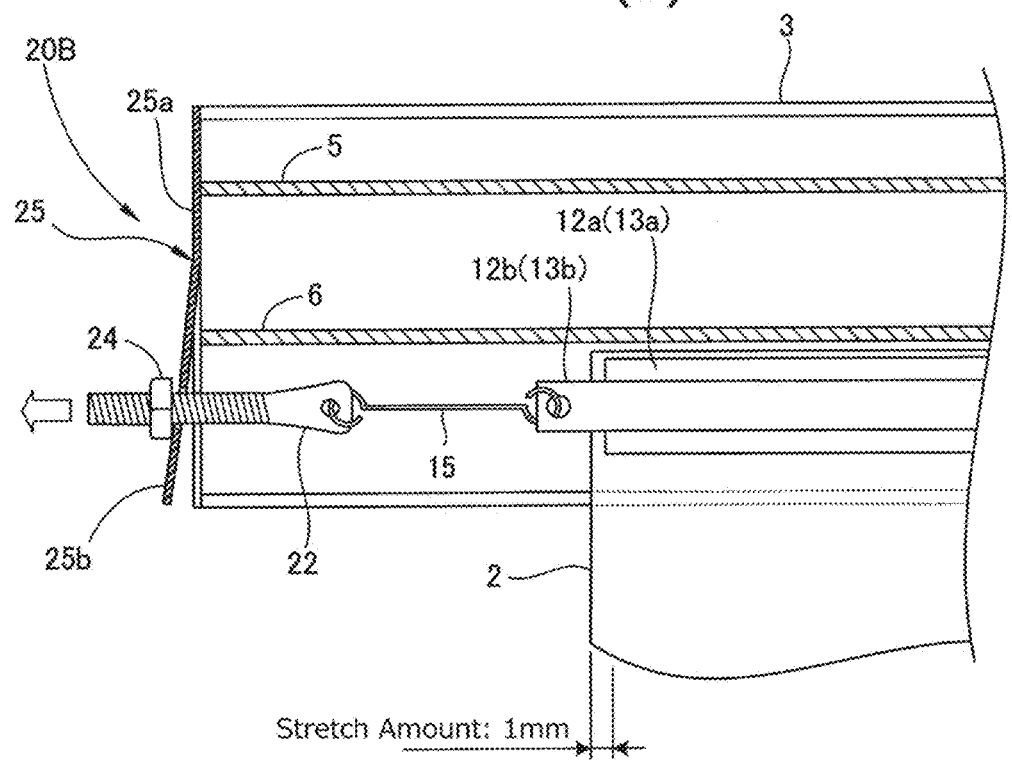

When the screen body 2 is under the tension in an initial stage of its use as shown in FIG. 13(*a*), flatness of the screen body 2 is maintained with the tension of about 3 kg acting sidewise of and outwardly of the screen body 2 as a result of being effected by the nut tightening amount that moves the nut 18 forward 1 mm relatively to the bolt 16.

There are cases where the screen body 2 slightly stretches horizontally with use, resulting from long-term repetition of variations in temperature and humidity. In these cases, the urging force from the nut receiving member 25*b* is transmitted to the bolt 16 through the nut 18, whereby the bolt 16, together with the nut 18, is urged sidewise of and outwardly of the screen body 2 as shown in FIG. 13(*b*). With the screen body 2 being tensioned outwardly and horizontally, the bolt 16, together with the nut 18, is moved sidewise of and outwardly of the screen body 2 by a stretch amount of the screen body 2. Consequently, even when the screen body 2 slightly stretches horizontally with use, the stretch amount is absorbed, whereby the tensioning can be maintained.

[Another Example (3) of Pull Mechanism]

Figure 14:
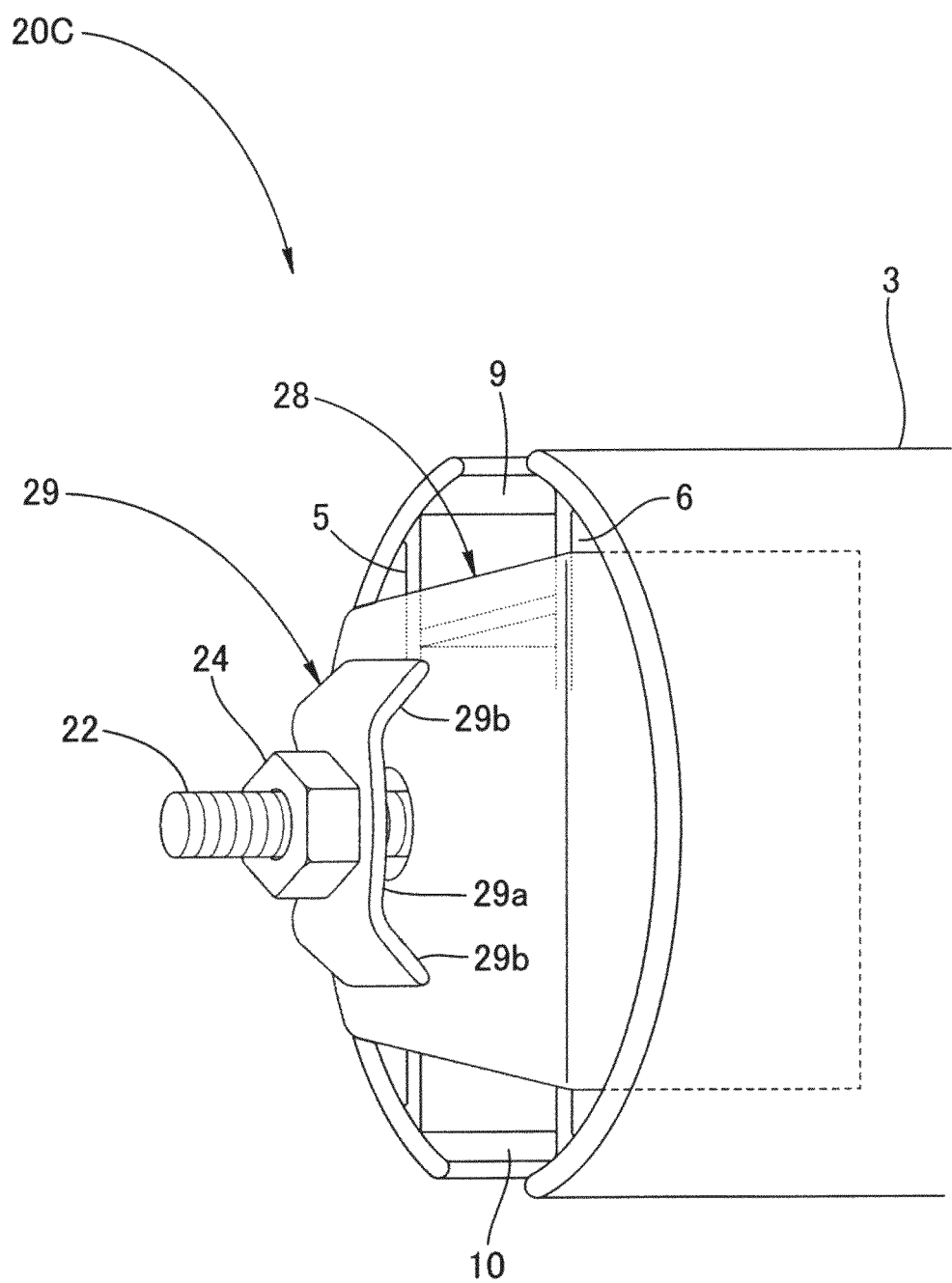
FIG. 14 is a partial perspective view illustrating another example (3) of the holding member pull mechanism.
Figure 15:
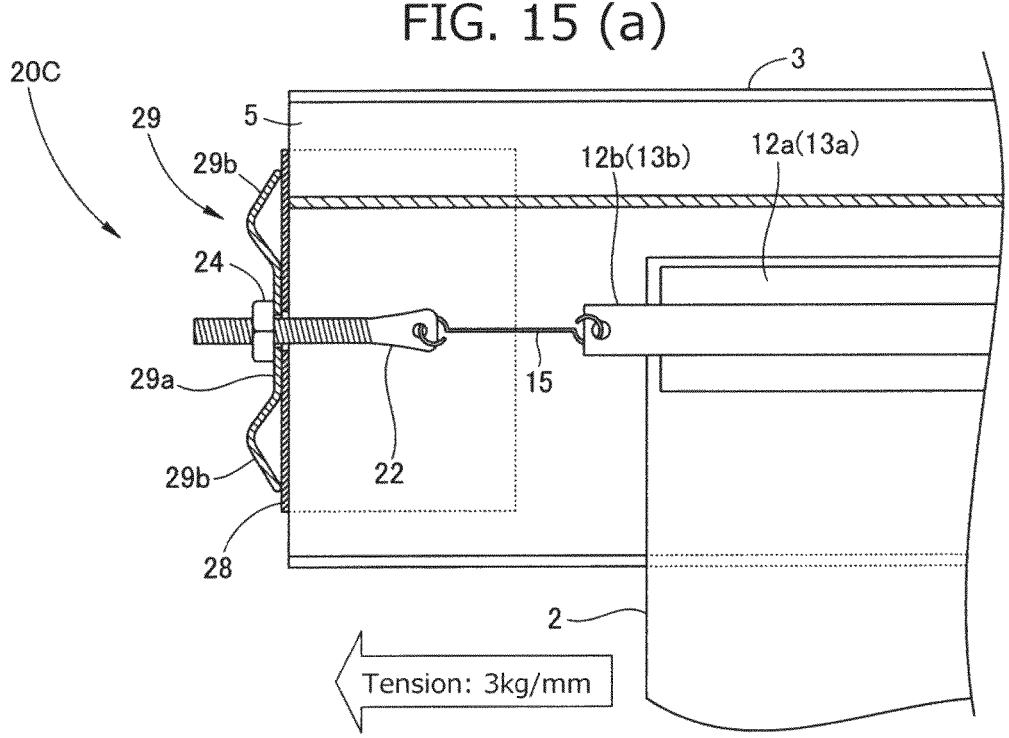
FIGS. 15(a) and 15(b) are longitudinal sectional views of an essential portion, illustrating the example (3) of the holding member pull mechanism, with FIG. 15(a) illustrating screen tensioning in an initial stage of the screen body's use and FIG. 15(b) illustrating screen tensioning after absorption of a horizontal stretch of the screen body.
Figure 15:
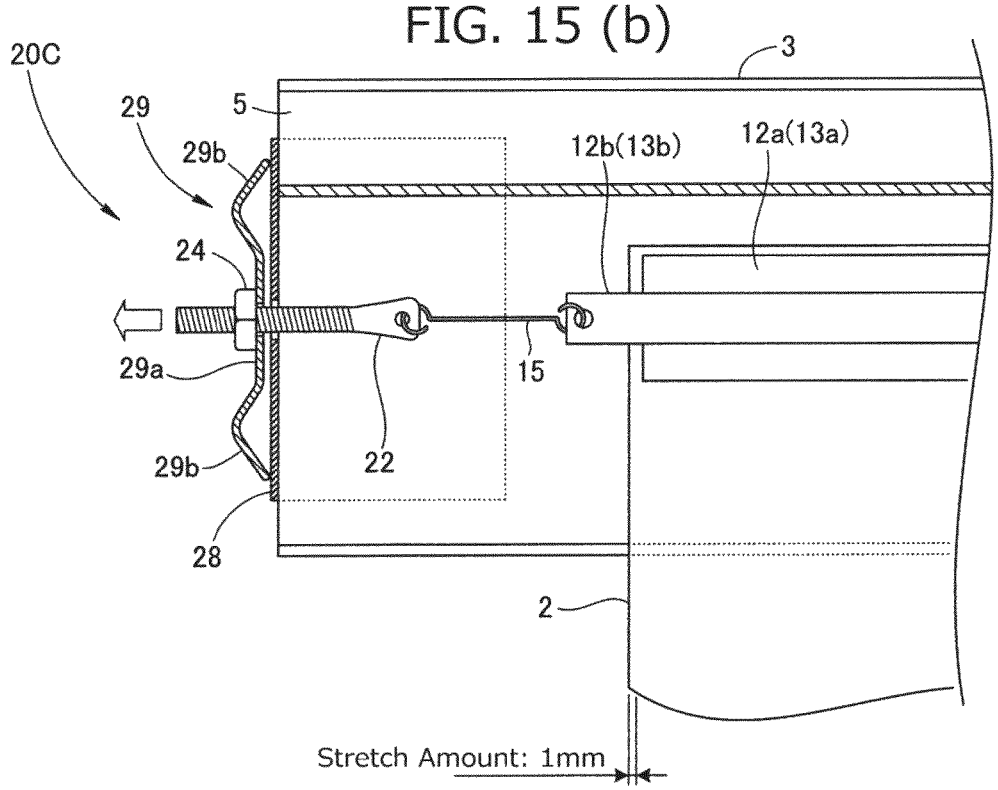

In the pull mechanism shown in FIGS. 14, 15(*a*), and 15(*b*), a slack-prevention-spring support plate 28 of gate-shaped cross section is mounted to an end face of a crossbar 3 so as to extend astride partition walls 5, 6. A slack prevention spring 29 is disposed between this slack-prevention-spring support plate 28 and the nut 18. The slack prevention spring 29 is formed of a plate-shaped elastic member such as a plate spring material made of spring steel (SUP10 or SK-5) or stainless steel (SUS304-CSP) and is formed by bending, as required, the belt-shaped plate spring material having a thickness of, for example, about 0.3 to 0.4 mm. The slack prevention spring 29 includes a nut receiving member 29*a* that engages the nut 18, and a pair of plate spring members 29*b* integrally connecting with respective ends of the nut receiving member 29*a*. The plate spring members 29*b* are each bent to have a cross section of substantially dog-leg shape. When the plate spring members 29*b* abut on the slack-prevention-spring support plate 28 at their respective leading edges in natural condition without their elastic deformation, a predetermined clearance is provided between the slack-prevention-spring support plate 28 and the nut receiving member 29*a* (refer to FIG. 15(*b*)).

In order to obtain such a spring characteristic as to generate an urging force of not more than 2 kg per 1 mm sidewise of and outwardly of the screen body 2, the slack prevention spring 29 is appropriately shaped to include appropriate setting of a distance between a hole through which the bolt 16 passes and the leading edge of each of the plate spring members 29*b* and appropriate setting of a width dimension. With such an extremely simple structure, the nut receiving member 29*a* can thus generate the urging force sidewise of and outwardly of the screen body 2.

An end of the bolt 16 is passed through the nut receiving member 29*a*. The nut receiving member 29*a* is disposed on a side where the nut 18 moves relatively to the bolt 16 when tightened, thereby taking a tightening load from the nut 18. As the nuts 18 are tightened, the tensions are transmitted to the respective pull holders 12*a*, 13*a* through the respective bolts 16, the respective joints 15, and the respective pull pieces 12*b*, 13*b*, whereby the screen body 2 held by the left-end-part holding member 12 and the right-end-part holding member 13 is tensioned leftward and rightward.

When a tension of about 3 kg is placed on the screen body 2 as a result of being effected by a nut tightening amount that moves the nut 18 forward 1 mm relatively to the bolt 16, the plate spring members 29*b* of the slack prevention spring 29 are elastically deformed under the tightening load from the nut 18 because the urging force that the slack prevention spring 29 generates is not more than 2 kg per 1 mm. The plate spring members 29*b* thus extend out so that their respective leading edges move outward with respective bends of the plate spring members 29*b* being as base points. Finally, the nut receiving member 29*a* is pushed against the slack-prevention-spring support plate 28 as shown in FIG. 15(*a*).

When the screen body 2 is under the tension in an initial stage of its use as shown in FIG. 15(*a*), flatness of the screen body 2 is maintained with the tension of about 3 kg acting sidewise of and outwardly of the screen body 2 as a result of being effected by the nut tightening amount that moves the nut 18 forward 1 mm relatively to the bolt 16.

There are cases where the screen body 2 slightly stretches horizontally with use, resulting from long-term repetition of variations in temperature and humidity. In these cases, the nut receiving member 29*a* that is urged sidewise of and outwardly of the screen body 2 by the plate spring members 29*b* utilizing resilience against bending of the plate-shaped elastic member transmits the urging force to the bolt 16 through the nut 18, whereby the bolt 16, together with the nut 18, is urged sidewise of and outwardly of the screen body 2 as shown in FIG. 15(*b*). With the screen body 2 being tensioned outwardly and horizontally, the bolt 16, together with the nut 18, is moved sidewise of and outwardly of the screen body 2 by a stretch amount of the screen body 2. Consequently, even when the screen body 2 slightly stretches horizontally with use, the stretch amount is absorbed, whereby the tensioning can be maintained.

[Another Example (4) of Pull Mechanism]

Figure 16:
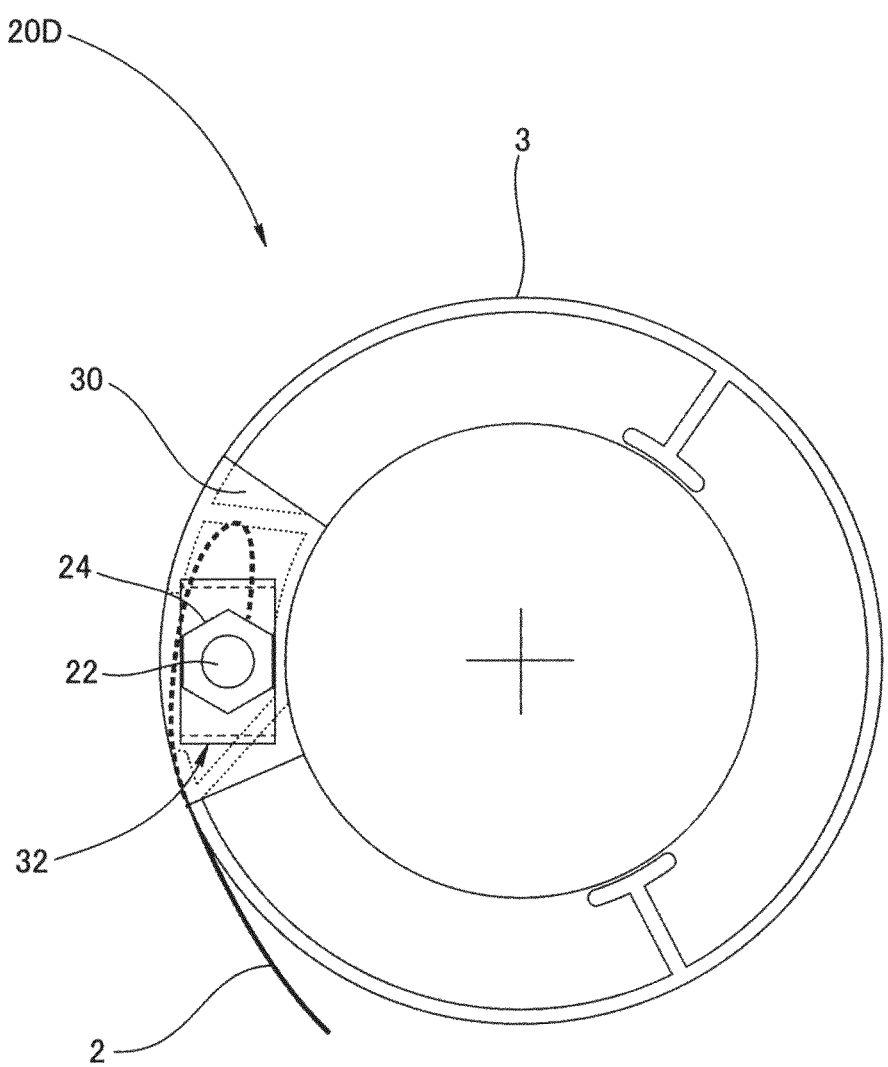
FIG. 16 is a side view illustrating another example (4) of the holding member pull mechanism.

In the pull mechanism shown in FIGS. 16, 17(*a*), and 17(*b*), a slack-prevention-spring support plate 30 is mounted to an outer-border portion of an end face of a crossbar 3. A slack prevention spring 31 is disposed between this slack-prevention-spring support plate 30 and the nut 18. The slack prevention spring 31 is formed of, for example, a compression coil spring made from a spring wire such as a piano wire (SWP-A) or a stainless steel wire (SUS304-WPB or SUS302) and is exteriorly fitted to an end of the bolt 16. A slack-prevention-spring cover 32 of gate-shaped cross section is disposed between the slack prevention spring 31 and the nut 18. The slack-prevention-spring cover 32 is formed by bending, as required, a metal plate material formed of, for example, SUS304 or an iron plate and includes a nut receiving member 32*a* that engages the nut 18, and a pair of legs 32*b* that integrally connects with respective ends of the nut receiving member 32*a* and extends straight toward the slack-prevention-spring support plate 30.

In order to obtain such a spring characteristic as to generate an urging force of not more than 2 kg per 1 mm sidewise of and outwardly of the screen body 2, the slack prevention spring 31 has a spring constant that is appropriately set to include appropriate setting of a wire diameter of the compression coil spring and appropriate setting of a number of turns. With such an extremely simple structure, the nut receiving member 32*a* can thus generate the urging force sidewise of and outwardly of the screen body 2.

An end of the bolt 16 is passed through the nut receiving member 32*a*. The nut receiving member 32*a* is disposed on a side where the nut 18 moves relatively to the bolt 16 when tightened, thereby taking a tightening load from the nut 18. As the nuts 18 are tightened, the tensions are transmitted to the respective pull holders 12*a*, 13*a* through the respective bolts 16, the respective joints 15, and the respective pull pieces 12*b*, 13*b*, whereby the screen body 2 held by the left-end-part holding member 12 and the right-end-part holding member 13 is tensioned leftward and rightward.

When a tension of about 3 kg is placed on the screen body 2 as a result of being effected by a nut tightening amount that moves the nut 18 forward 1 mm relatively to the bolt 16, the slack prevention spring 31 is elastically deformed by taking the tightening load from the nut 18 via the nut receiving member 32*a* of the slack-prevention-spring cover 32 because the urging force that the slack prevention spring 31 generates is not more than 2 kg per 1 mm. The slack-prevention-spring cover 32 is thus moved so that its pair of legs 32*b* approaches the slack-prevention-spring support plate 30. Finally, the pair of legs 32*b* abuts against the slack-prevention-spring support plate 30 as shown in FIG. 17(*a*).

When the screen body 2 is under the tension in an initial stage of its use as shown in FIG. 17(*a*), flatness of the screen body 2 is maintained with the tension of about 3 kg acting sidewise of and outwardly of the screen body 2 as a result of being effected by the nut tightening amount that moves the nut 18 forward 1 mm relatively to the bolt 16.

There are cases where the screen body 2 slightly stretches horizontally with use, resulting from long-term repetition of variations in temperature and humidity. In these cases, the urging force is transmitted from the nut receiving member 32*a* that is urged sidewise of and outwardly of the screen body 2 by the slack prevention spring 31 to the bolt 16 through the nut 18, whereby the bolt 16, together with the nut 18, is urged sidewise of and outwardly of the screen body 2 as shown in FIG. 17(*b*). With the screen body 2 being tensioned outwardly and horizontally, the bolt 16, together with the nut 18, is moved sidewise of and outwardly of the screen body 2 by a stretch amount of the screen body 2. Consequently, even when the screen body 2 slightly stretches horizontally with use, the stretch amount is absorbed, whereby the tensioning can be maintained.

Figure 18:
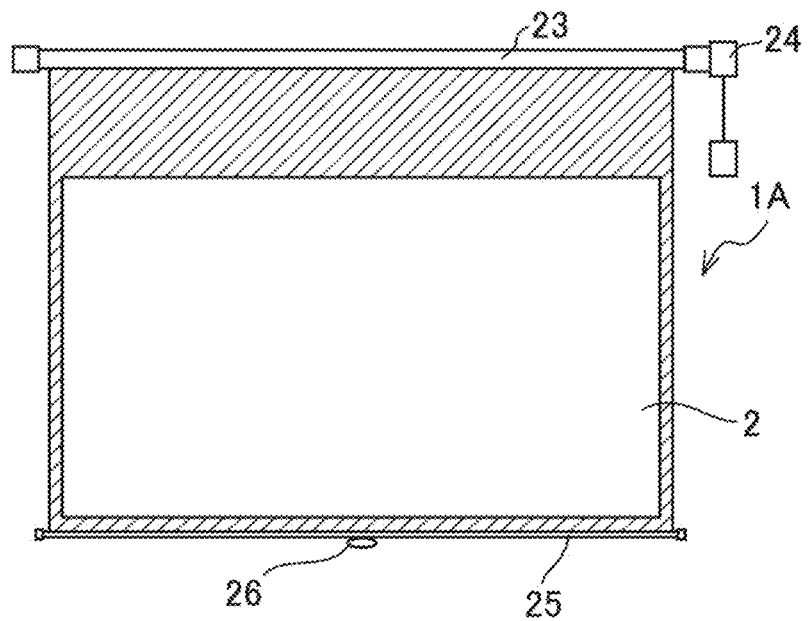
FIGS. 18(a) and 18(b) respectively illustrate a roll-up screen apparatus to which the present invention is applied and a floorstanding roll-up screen apparatus to which the present invention is applied.
Figure 18:
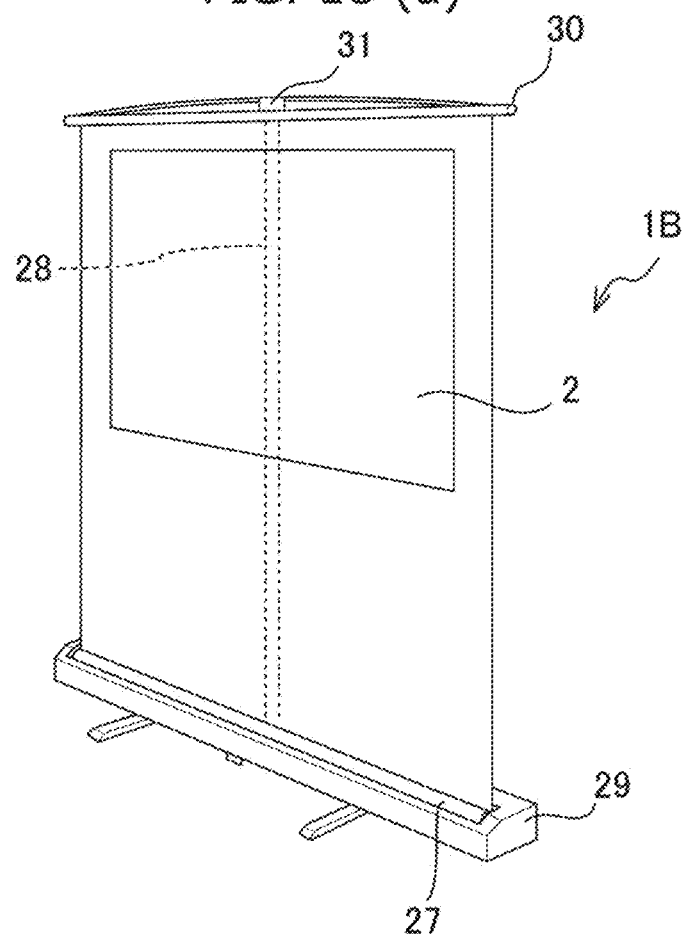
Figure 19:
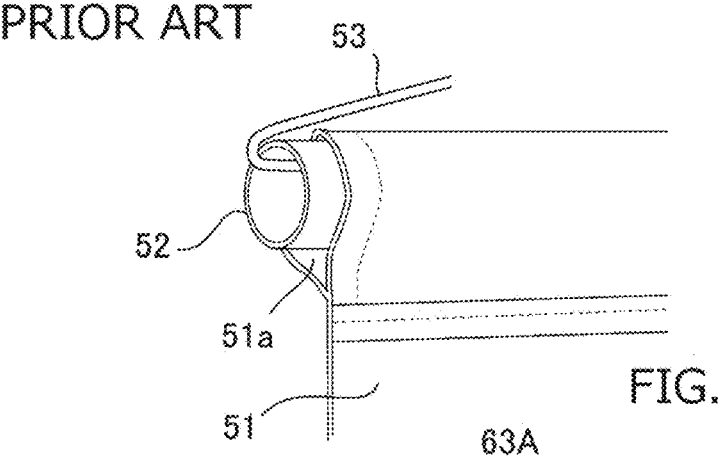
FIGS. 19(a) to 19(c) each illustrate a method of holding a screen body of a screen apparatus, with FIG. 19(a) showing a conventional example (1) and FIGS. 19(b) and 19(c) showing a conventional example (2)
Figure 19:
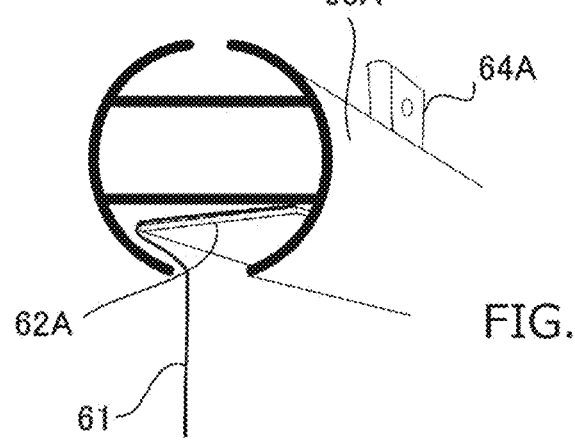
Figure 19:
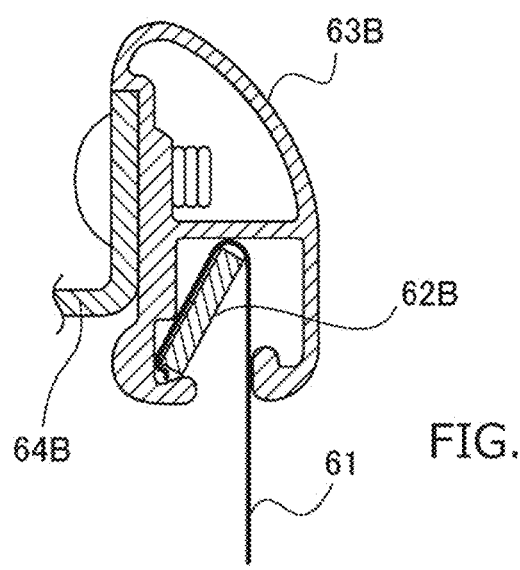
Figure 20:
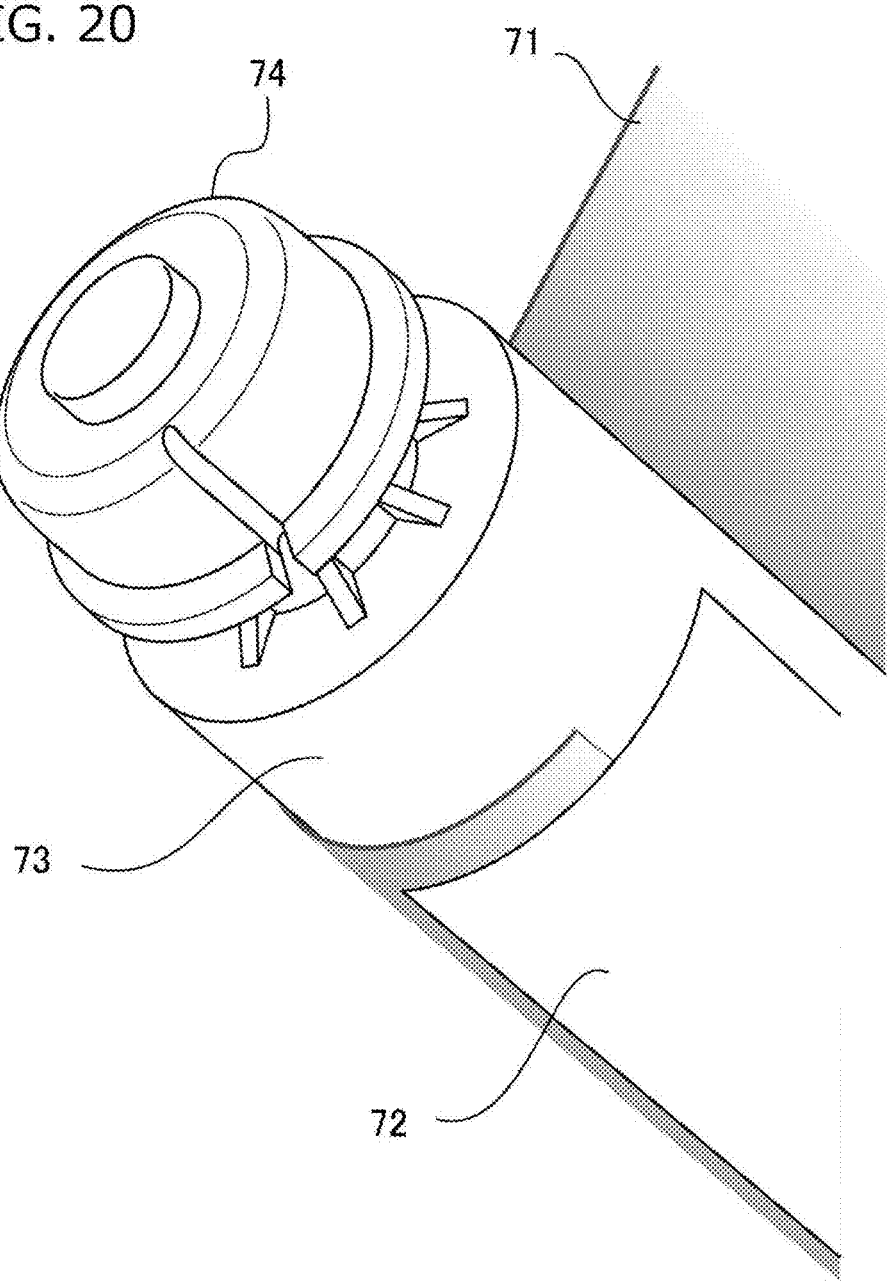
FIG. 20 illustrates a method of holding a screen body of a screen apparatus in a conventional example (3)
Figure 21:
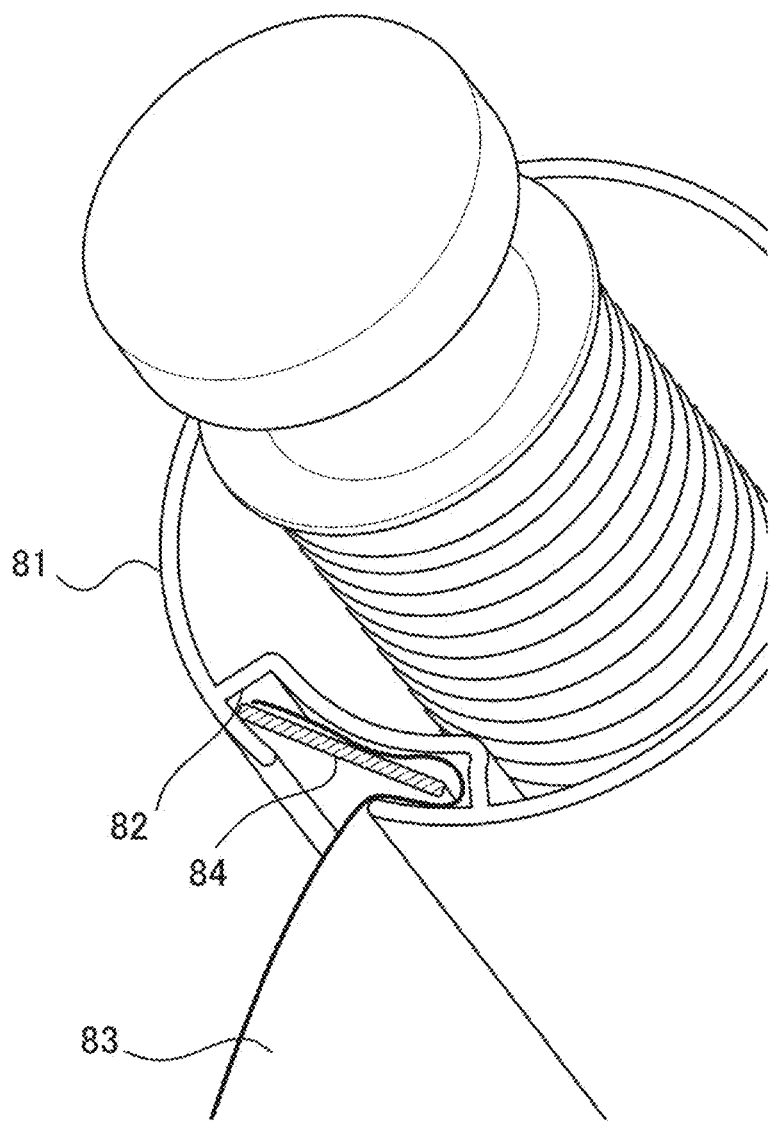
FIG. 21 illustrates a method of holding a screen body of a screen apparatus in a conventional example (4)
Figure 22:
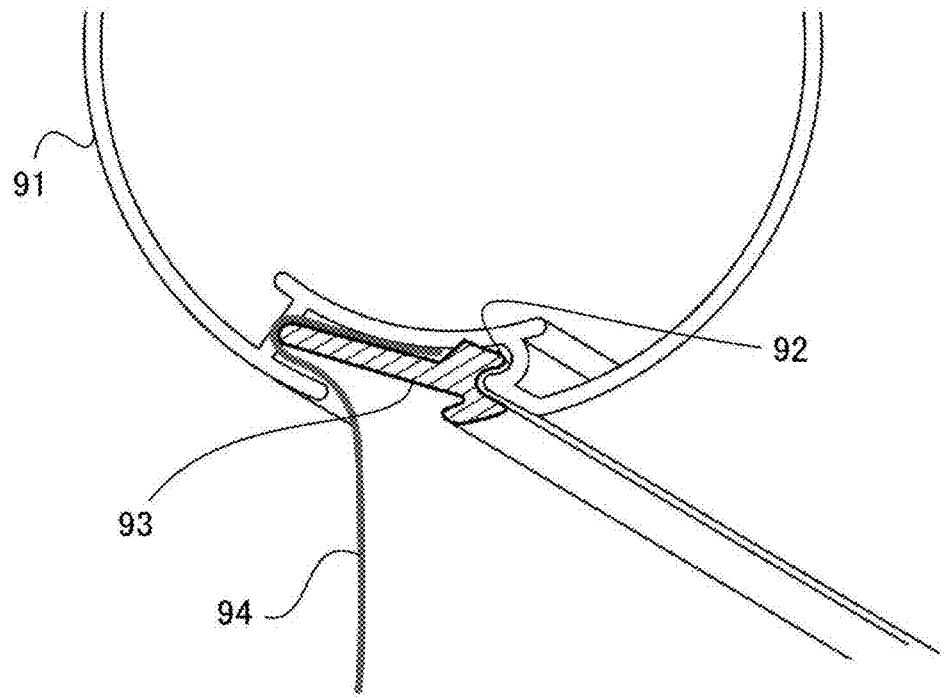
FIGS. 22(a) and 22(b) each illustrate a method of holding a screen body of a screen apparatus in a conventional example (5)
Figure 22:
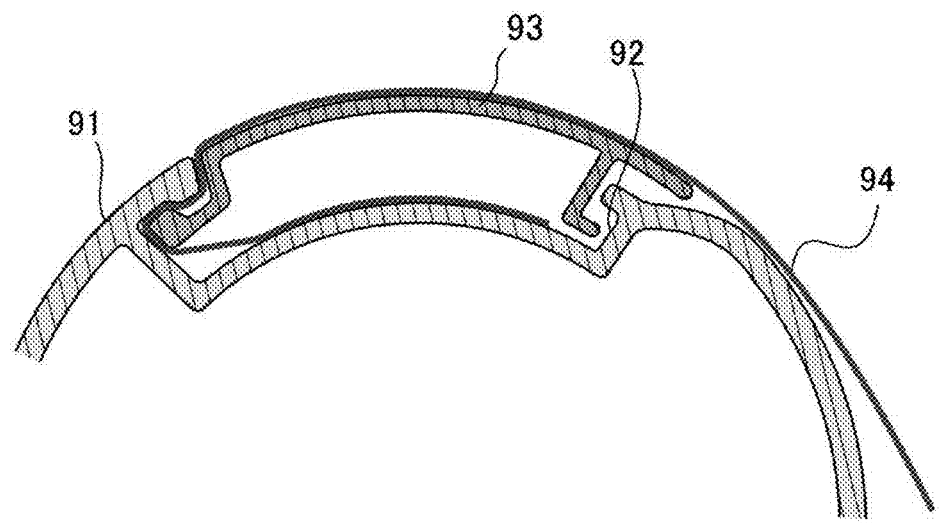
Figure 23:
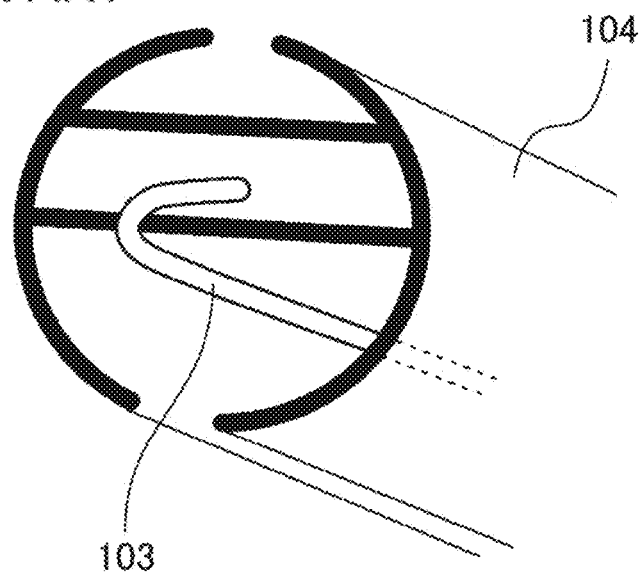
FIGS. 23(a) and 23(b) illustrate a method of expanding a screen body of a screen apparatus in a conventional example (6)
Figure 23:
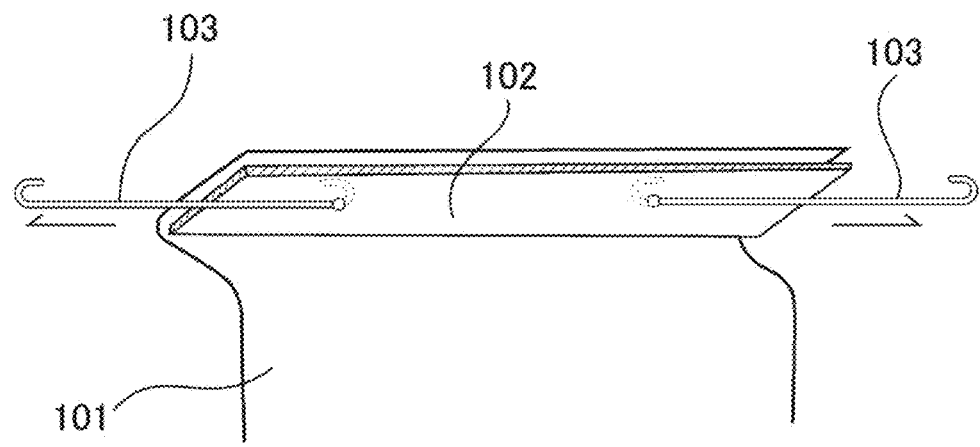
Figure 24:
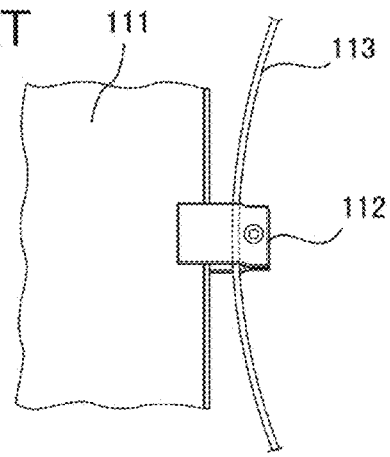
FIGS. 24(a), 24(b), and 24(c) illustrate a method of expanding a screen body of a screen apparatus in a conventional example (7)
Figure 24:
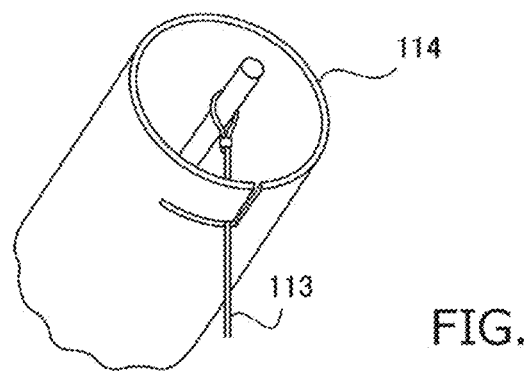
Figure 24:
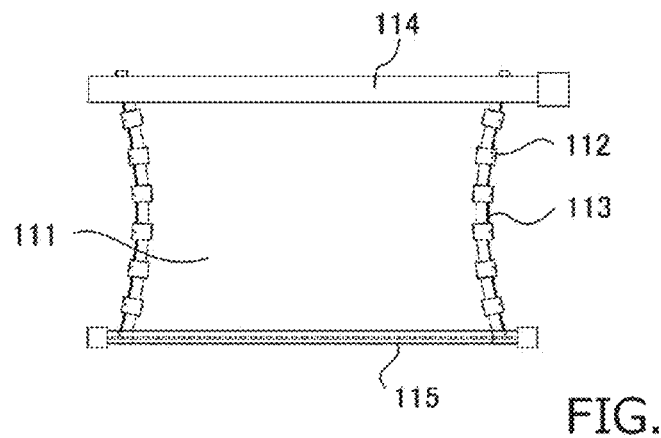
Figure 26:
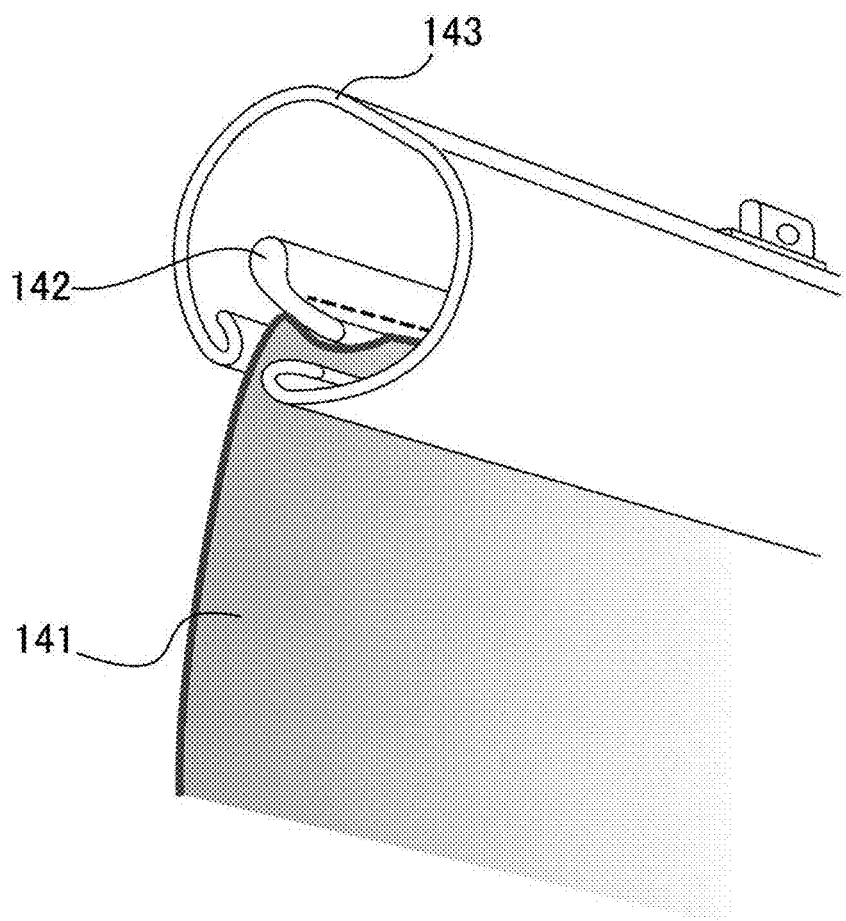
FIG. 26 illustrates a method of expanding a screen body of a screen apparatus in a conventional example (10)
Figure 28:
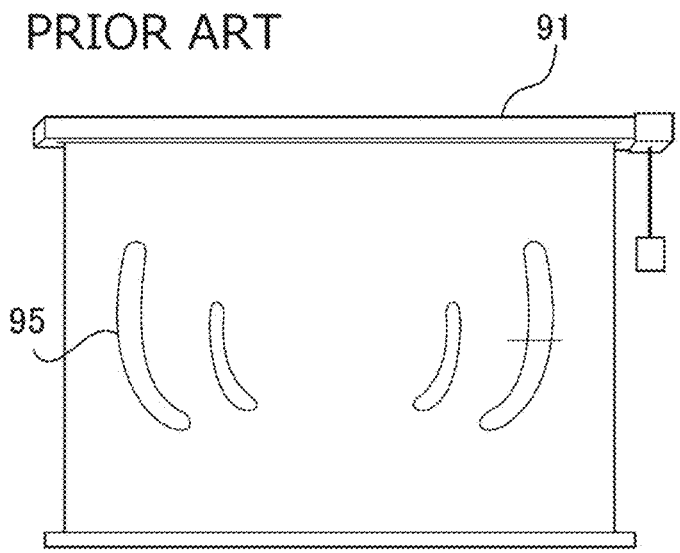
Figure 28:
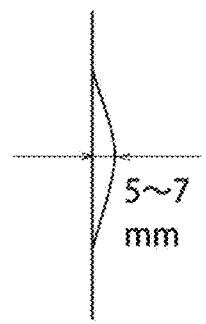
Figure 28:
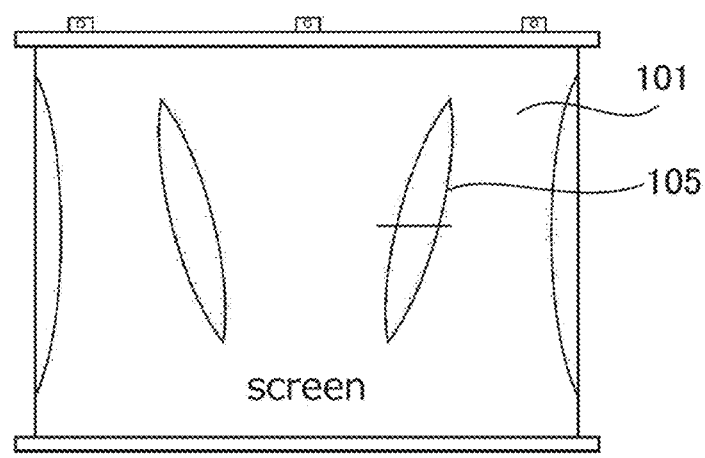
Figure 28:
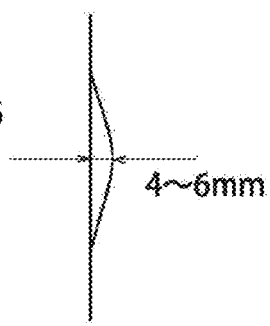
Figure 29:
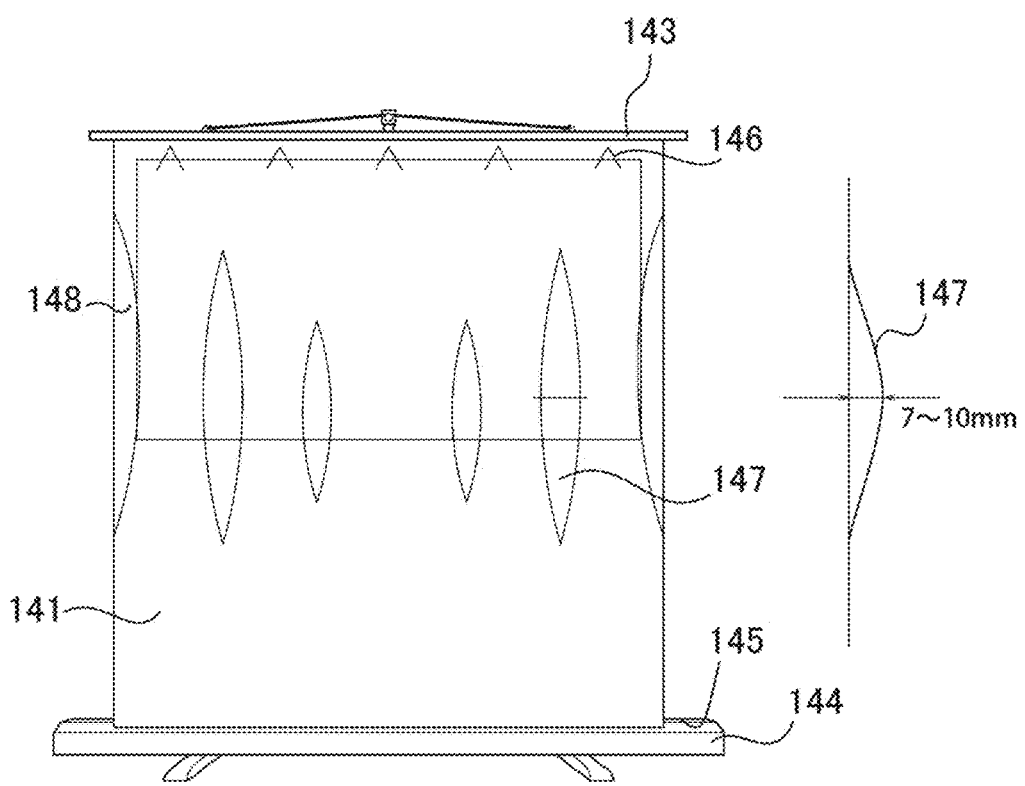
FIGS. 29(a) and 29(b) illustrate wrinkles caused to the screen apparatus of the conventional example (10)
Figure 30:
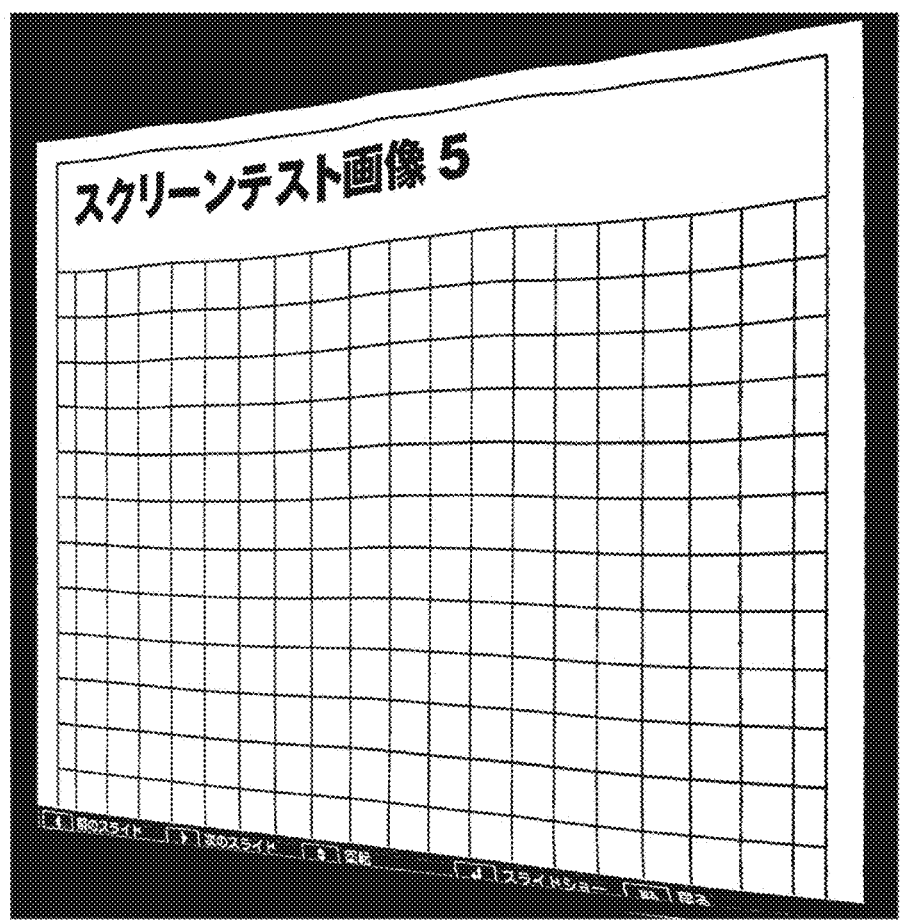
FIG. 30 illustrates distortion in a screen test image.

The above exemplary embodiments have been described for application to the suspended screen apparatus of the hanging scroll type that is shown in FIG. 1. However, the present invention is also applicable to a roll-up screen apparatus 1A such as shown in FIG. 18(*a*) as well as to a floorstanding roll-up screen apparatus 1B such as shown in FIG. 18(*b*). The roll-up screen apparatus 1A (FIG. 18(*a*)) mentioned here includes a winding drum 33 that is rotated by an electric motor or spring force. An upper end of a screen body 2 is attached to this winding drum 33 and is rolled up and down by means of a roll-up device 34. In the drawing, reference mark 35 denotes a lower crossbar, and reference mark 36 denotes a handle. On the other hand, the floorstanding roll-up screen apparatus 1B (FIG. 18(*b*)) includes, in its lower position, a winding drum 37 that is rotated by an electric motor or spring force, and an end of a screen body 2 is pulled upward and is then mounted to a support 38 erected from the lower position for expansion. In the drawing, reference mark 39 denotes a roll-up device, reference mark 40 denotes an upper crossbar, and reference mark 41 denotes a support mounting part.

INDUSTRIAL APPLICABILITY

A screen apparatus of the present invention has been invented based on the principle that a material used for a screen body stretches and shrinks and can provide images of high quality at low costs, so that the present invention has extremely great industrial applicability.

REFERENCE SIGN LIST 1, 1A, 1B screen apparatus
2 screen body
3 upper crossbar (crossbar)
3A, 33 winding drum
4 lower crossbar
5, 6 partition wall
7, 8 opening (slit)
9, 10 recess
11 screen holding member
12 left-end-part holding member
12*a* pull holder
12*b* pull piece
12*c* height-maintaining holding piece
13 right-end-part holding member
13*a* pull holder
13*b* pull piece
13*c* height-maintaining holding piece
14 central-part holding member
14*a* height-maintaining holding piece
15 joint
16 bolt
17 nut fastener
18 nut
23 end plate
23*c* nut receiving member
25 end plate
25*b* nut receiving member
29 slack prevention spring 29*a* nut receiving member
29*b* plate spring member
31 slack prevention spring (compression coil spring)
32 slack-prevention-spring cover
32*a* nut receiving member
34, 39 roll-up device

What is claimed is:

1. A screen apparatus comprising:
a crossbar having a tubular shape, the crossbar being provided to an upper end of a screen body and being configured to suspend and roll up the screen body; and
a holding member disposed inside the crossbar, the holding member holding the upper end of the screen body,
wherein the holding member comprises at least three divisions including:
a left-end-part holding member disposed on a left-end side of the crossbar, the left-end-part holding member holding a left end part of the screen body and being configured to pull the screen body axially with respect to the crossbar toward a left end of the crossbar;
a right-end-part holding member disposed on a right-end side of the crossbar, the right-end-part holding member holding a right end part of the screen body and being configured to pull the screen body axially with respect to the crossbar toward a right end of the crossbar; and
a central-part holding member disposed between the left-end-part holding member and the right-end-part holding member, the central-part holding member holding a central part of the screen body;
wherein each of the left-end-part holding member and the right-end-part holding member comprises:
a pull holder that is plate-shaped, the pull holder holding the screen body;
a pull piece adhesively fixed to an end of the pull holder;
a bolt connected to an end of the pull piece via a joint; and
a nut screwed on the bolt, the nut being configured to give tension to the bolt by being rotated.

2. The screen apparatus according to claim 1, wherein:
the central-part holding member is divided into a plurality of holding pieces; and
the screen body's upper end held by the central-part holding member maintains its upper positions and lower positions horizontal without being affected by tension of the left-end-part holding member and tension of the right-end-part holding member.

3. The screen apparatus according to claim 2, wherein:
the crossbar is internally provided with a recess that accommodates the left-end-part holding member, the right-end-part holding member, the central-part holding member, and the screen body's upper end that is held by the left-end-part holding member, the right-end-part holding member, and the central-part holding member; and
the recess is formed so that when viewed in cross section, respective long sides of the left-end-part holding member, the right-end-part holding member, and the central-part holding member assume an inclined position as the screen body having its upper end accommodated by the recess moves under its own weight.

4. The screen apparatus according to claim 1, wherein a nut receiving member is disposed on a side where the nut moves relatively to the bolt when tightened, takes a tightening load from the nut and generates urging force sidewise of and outwardly of the screen body.

* * * * *